(12) United States Patent
Tokushima

(10) Patent No.: US 7,158,711 B2
(45) Date of Patent: Jan. 2, 2007

(54) STRUCTURE OF PHOTONIC CRYSTAL

(75) Inventor: Masatoshi Tokushima, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 11/312,207

(22) Filed: Dec. 19, 2005

(65) Prior Publication Data

US 2006/0104586 A1    May 18, 2006

Related U.S. Application Data

(63) Continuation of application No. PCT/JP2004/008350, filed on Jun. 15, 2004.

(30) Foreign Application Priority Data

Jun. 19, 2003 (JP) .............................. 2003-174930

(51) Int. Cl.
*G02B 6/10* (2006.01)
*H01S 3/00* (2006.01)

(52) U.S. Cl. .................... 385/131; 385/11; 385/14; 385/120; 385/130; 385/141; 385/122; 359/333; 359/342; 359/344

(58) Field of Classification Search .............. 385/14, 385/40, 129, 130, 131, 132, 123, 124, 125, 385/141, 11, 122; 359/333, 341.1, 342, 344
See application file for complete search history.

(56) References Cited

U.S. PATENT DOCUMENTS

| 6,134,369 | A  | * | 10/2000 | Kurosawa ................ 385/132 |
| 6,542,682 | B1 | * | 4/2003  | Cotteverte et al. .......... 385/125 |
| 6,643,439 | B1 | * | 11/2003 | Notomi et al. .............. 385/125 |
| 2002/0118941 | A1 |   | 8/2002 | Notomi et al. .............. 385/129 |
| 2003/0185532 | A1 | * | 10/2003 | Hosomi et al. ............. 385/129 |

FOREIGN PATENT DOCUMENTS

| JP | 200-121987   | 4/2000  | ............ 385/129 X |
| JP | 2001-174659  | 6/2001  | ............ 385/129 X |
| JP | 2001-318247  | 11/2001 | ............ 385/129 X |
| JP | 2001-337236  | 12/2001 | ............ 385/129 X |
| JP | 2002-350657  | 12/2002 | |
| JP | 2003-43277   | 2/2003  | ............ 385/129 X |
| JP | 2003-57460   | 2/2003  | ............ 385/129 X |
| JP | 2003-128429  | 5/2003  | ............ 385/129 X |

OTHER PUBLICATIONS

Solid Physics, vol. 32, No. 11, 1977, p. 862.
PCT/IB/338 (Notification of Transmittal of Copies of Translation of The International Preliminary Report on Patentability).
English Translation of International Preliminary Report on Patentability.

* cited by examiner

*Primary Examiner*—Brian M. Healy
(74) *Attorney, Agent, or Firm*—Scully, Scott, Murphy & Presser, P.C.

(57) ABSTRACT

Disclose is a photonic crystal structure comprises atomic dielectric pillars having a refractive index distribution and a structure which are both mirror-symmetrical in a thicknesswise direction of the photonic crystal. The atomic pillars are arrayed in a two-dimensional lattice pattern to form a dielectric pillar lattice. The dielectric pillar lattice is disposed within a surrounding dielectric having a uniform or substantially uniform refractive index distribution. An organic resin which serves as part of surrounding dielectric is disposed in an asymmetrical position in a thicknesswise direction of the photonic crystal.

47 Claims, 15 Drawing Sheets

13 ; BACKGROUND MEDIUM
9 ; SUBSTRATE
10 ; MEDIUM ATOM
11 ; CLADDING
12 ; CLADDING

STRUCTURE OF PHOTONIC CRYSTAL

CROSS-REFERENCE TO RELATED APPLICATIONS

This application is a continuation of International Application No. PCT/JP2004/008350, filed on Jun. 15, 2004, and claims priority to Japanese Patent Application No. 2003-174930, filed on Jun. 19, 2003, both of which are incorporated herein by reference in their entireties.

FIELD OF THE INVENTION

The present invention relates to a structure of photonic crystal and particularly to a structure of pseudo-two-dimensional photonic crystal.

BACKGROUND OF THE INVENTION

A photonic crystal is generally referred to as to a composite dielectric crystal comprising two or more dielectric materials having different dielectric constants, which are periodically arrayed in such a manner that the crystal has a lattice constant substantially equal to a wave length of light (generally, electromagnetic wave). Light propagating through the photonic crystal has peculiar wave length dispersion characteristics unlike homogeneous dielectric materials.

The photonic crystal may be classified into three kinds of crystal, such as one-, two- and three-dimensional crystals depending upon the number of directions in which the dielectric medium distribution has a periodicity. A variety of structures for respective dimension numbers have been proposed. Several examples are listed in tables of non-patent document 1 described below.

There is disclosed a structure of multi-layered dielectric films having a periodical structure electric thin films which are stacked in an equally spaced manner as one-dimensional photonic crystals. In this structure, the two layers made up of a dielectric thin films having a refractive index higher than 1 and a dielectric layer of the air having a refractive index of 1 (Note that the air layer may be considered as a dielectric layer) are alternately disposed in a periodical manner.

Two-dimensional structure may include a structure in which a dielectric substrate is formed with elongated vertical holes in a square lattice pattern or a triangular lattice pattern, and a structure in which elongated columns are arrayed. Three-dimensional structure may include a structure in which a diamond lattice is implemented by boring a dielectric substrate with three slanted holes which are equally spaced by an angle of 120°. A face-centered cubic lattice structure has been devised in which parallel cross structures comprising dielectric rods which are disposed at an equal space in a parallel manner are stacked in a layered manner.

In such a manner, the photonic crystal can be classified based upon the number of dimensions as well as the periodical structure of the dielectric medium distribution and further classified into triangular lattice, square lattice, diamond lattice, face-centered square lattice structures and the like depending upon its lattice structure. Specific structures are different depending upon the fabrication process of crystals.

Various efforts to implement an optical integrated circuit using such a photonic crystal as a platform have been made since it is considered that use of the photonic band gap of the photonic crystal allows the flow of light in the photonic crystal to be freely controlled.

While, light is generally able to propagate through the photonic crystal, light having a frequency in a specific frequency range is not able to propagate through the photonic crystal. This specific frequency range is referred to as "photonic band gap". If a defect is introduced into a photonic crystal, the defect provides an inherent mode in which the crystal has an energy level in the photonic band gap. An inherent mode refers a state of electromagnetic field in which the electromagnetic field has a specific energy (equivalent to the frequency) and the distribution pattern of electromagnetic field, and which is independent itself. The inherent mode of the defect may be also simply referred to as "defect mode". Light in the defect mode in the photonic band gap has an energy in which is concentrated in the vicinity of the defect. Accordingly, light is apparently is confined in the position of the defect.

If the defect which is introduced into the photonic crystal is a point defect, the point defect can be considered as a very small light resonator. If the defect is a line-defect, it can be considered as a light waveguide (optical wiring) since the light is guided along the line-defect.

It is considered that combination of the point defect, line-defect and other defect structure provides various functional elements necessary to form optical circuits, such as power dividers, power combiners, wave length multiplexers, wave length multiplexers, wave length filters, optical switches and the like.

Since even one-dimensional photonic crystal such as a dielectric periodical multi-layered film is able to control transmission of light in one direction, reflection and selection of wave length, it is considered that it is possible to produce simple optical functional elements and one-dimensional circuits for simple optical functional elements. In order to configure complicated optical integrated circuit, it is necessary to two- or three-dimensionally arrange the optical functional elements. Therefore, photonic crystal having a period of two or more dimensions is needed.

Two-dimensional photonic crystal can utilize the properties of the photonic band gap in two directions in which the dielectric constant periodically changes (for example, in x and y directions). Since the distribution of the refractive index is uniform (no changes) in another direction (z direction), light can not be confined by the properties of the photonic band gap. In a practical optical circuit, it is necessary to cause a light beam having a definite diameter input from an optical fiber to propagate in the photonic crystal. However, the light would be dissipated (leaked) in a z direction in which the properties of the photonic band gap can not be used.

On the other hand, since the three-dimensional photonic crystal can utilize the photonic band gap which is common to all three directions, it is considered that it can ideally realize optical guide or other optical functional elements which cause no dissipation (leak) of light. However, the number of steps which are necessary to fabricate the three-dimensional photonic crystal is remarkably larger compared to that of one- or two-dimensional structure, so that it is difficult to fabricate it. Even if it can be fabricated, fabrication cost becomes very high. One of the advantages of integrating the optical circuit resides in a remarkable reduction in fabrication cost. The fact that this advantage can not be obtained is a basic problem of the using three-dimensional photonic crystal as a platform for optical integrated circuit.

Therefore, a structure called as "photonic crystal slab" has been studied to use the photonic crystal for integrated optical circuits. The photonic crystal slab has a structure which is obtained by cutting two-dimensional photonic crystal so that the slab has a definite thickness in a direction (above-mentioned z-direction) in which no changes in the dielectric constant occur.

A detailed structure of the photonic slab is disclosed in patent documents. Drawing of the patent document 1 is cited and is shown in FIG. 15 of the present application. At page 14, column 14 of the patent document 1, there is a description of FIG. 1 (FIG. 15 annexed to the specification of the present application). The substrate 1 is sandwiched on both sides thereof between first and second claddings 2 and 3. The substrate 1 has medium atoms 5 which are periodically buried in a background medium 4 in a two-dimensional and triangular arrangement. Medium atoms which are also termed as atomic dielectric pillars refer to dielectric members which are arranged in a lattice like atoms in a crystalline and whose shape are same as atoms in a crystalline. In this description, "the substrate 1" is equivalent to a structure of the two-dimensional crystal having a definite thickness.

For simplicity of description of the present specification, a layer having a definite thickness equivalent to a portion cut from the two-dimensional photonic crystal in the structure of the photonic crystal slab and dielectric layers which sandwich a core on the both sides thereof will be referred to as "core" and "cladding", respectively. These technical terms are compliant with those of the slab wave guide.

Confinement of light in a thicknesswise direction in a photonic crystal slab is not achieved using properties of the photonic band gap, but is achieved using total internal reflection properties due to the difference in refractive indices. The confinement will be achieved as follows:

A plane of two-dimensional photonic crystal including two directions in which the dielectric constant changes in a periodical manner is referred to as "periodical plane". At this time, light which is incident upon the two-dimensional photonic crystal in a direction parallel to the periodical plane will become Bloch wave in which original light (0-order diffracted light) is combined with a number of high order lights at a given ratio. If the cladding is made of such a dielectric material, the wave length of propagating light is longer than that of any diffracted light (including 0-order diffracted light) in the Bloch light, the photonic crystal slab including a core having a definite thickness, which is cut from the two-dimensional photonic crystal is able to confine light in a thicknesswise direction due to total internal reflection effect.

Confinement of light due to total internal reflection in prior art slab wave guide in which the dielectric constant distribution of the core has no periodicity corresponds to a case in the above-mentioned total internal reflection mechanism, in which only 0-order diffracted light exists. In order to confine light in the vicinity of a core layer in the slab wave guide, it is necessary to make the refractive index of the core larger than that of the cladding. In case of the photonic crystal slab, the total internal reflection is achieved by making the transmission refractive index of the core layer regarding an individual diffracted wave larger than that of the cladding.

In such a manner, confinement of light in a thicknesswise direction is achieved by total internal reflection due to difference in refractive index in case of photonic crystal slab. Unlike the case of the photonic band gap, total internal reflection does not necessarily occur in all portions of the photonic crystal slab. If there is a portion in which the periodicity of the refractive index collapses in a light propagating direction in the photonic crystal slab, diffracted light having a wave length larger than that in the cladding layer is generated.

Accordingly, the diffracted light does not meet the requirements of total internal reflection due to difference in refractive indices and will be scattered into the cladding. In this meaning, the photonic crystal slab will not become equivalent to the three-dimensional photonic crystal which is constantly able to confine light in all three directions. Since a portion in which the periodicity of the refractive index distribution collapses in a light propagating direction is relevant to all optical functional element such as a bending portion of line-defect wave guide and optical resonant comprising a point defect in optical circuits, excluding linear line-defect wave guide, the fact that light will leaked into the cladding at these portions is a serious problem for forming an optical circuit.

Loss of light due to its leakage can be often reduced to some extent by elaborated design. Accordingly, it is considered that, although manufacturing of large scale optical integrated circuit is difficult, the photonic crystal slab can be used as a platform of small scale optical integrated circuit in which loss of light in wave guide is less.

Although the photonic crystal slab has a definite thickness, it can be said that the photonic crystal slab is a pseudo two-dimensional photonic crystal. Thus, the photonic crystal slab has characteristics with respect to light propagation, which are similar to those of the two-dimensional photonic crystal. One of the characteristics is mode separation of guided wave depending upon the light polarization direction.

There exist in the wave-guide mode of the two-dimensional photonic crystal and its line-defect wave guide, two modes which are independent to each other. The two modes comprises a transverse magnetic mode (TM mode) in which only magnetic field components exist in two directions parallel to a desired periodical plane and a transverse electric mode (TE mode) in which only an electric field component exists in one direction normal to the periodical plane. Since some publications define TM and TE modes, vice versa, attention should be paid to find the exact directions of electric and magnetic fields. The above-mentioned definition will be consistently adopted herein. The two wave-guide modes will not interfere and couple with each other even when light of both mode have the same frequency. Separation of the wave-guide mode into TM and TE mode is due to the fact that the distribution of the refractive index of the two-dimensional photonic crystal is uniform in a direction normal to the periodical plane, resulting in that the two-dimensional photonic crystal has a structure which is mirror symmetrical with respect to a desired periodical plane.

The photonic crystal slab and its line-defect wave guide have a refractive index distribution which is not uniform in a thicknesswise direction. If the refractive index distribution is mirror-symmetrical in a thicknesswise direction, the wave-guide mode is separated into two wave-guide modes in which the electric field is perpendicular to the magnetic field on its mirror symmetrical plane. One of two modes is a TM-like mode having properties of TM mode while the other mode is TE-like mode having properties of TE mode. Both TM- and TE-like modes will not interfere with each other for coupling even at the same frequency.

A requirement that the refractive index distribution be mirror-symmetrical in a thicknesswise direction is only requited to be substantially met in a range in which the electromagnetic energy of the wave-guided light is distributed. Since the electromagnetic energy of wave-guided light is confined in the vicinity of a core, it suffices that the refractive index distribution is mirror-symmetrical in the vicinity of a core and parts adjacent thereto of a cladding layer. Even if such a mirror-symmetrical structure is applied to the other substrate, that is, the whole of the structure does not meet the mirror-symmetry, the mirror-symmetry of the photonic crystal slab structure for guide light is not substantially lost provided that the refractive index distribution is mirror-symmetrical even in the vicinity of the core in which the light energy of wave-guided light is distributed. A term "mirror-symmetrical" will be used herein in this meaning unless otherwise defined.

The fact that the wave-guide modes of the photonic crystal slab can be separated into TM-like mode and TE-like mode is very important to use the line-defect wave guide of the photonic crystal slab. This is due to the fact that the photonic band gaps for TM-like mode and TE-like modes in the photonic crystal slab generally exists in different frequency ranges. If there is a frequency range in which the photonic band gaps of both modes overlaps, this range is limited to a narrow one. Accordingly, when the line-defect of the photonic crystal slab is used as a light wave guide by advantageously utilizing the properties of the photonic band gap, a need to use either one of TM-like mode and TE-like mode arises.

If the refractive index distribution of the photonic crystal slab becomes mirror-asymmetrical in a thicknesswise direction, two modes which are to be TM-like mode would couple with each other to become one mode. As a result, light which could have been input into the line-defect wave guide in TM-like mode will not be confined in the vicinity of the line-defect and will be leaked away.

Thus, mirror-symmetry of the refractive index distribution of the photonic crystal slab in such a manner is a requirement to separate between TM-like mode and TE-like mode.

For realizing of a photonic crystal slab having a refractive index distribution which is mirror-symmetrical, ease of manufacturing of the photonic crystal slab is an important factor. If its fabrication is difficult, the mirror-symmetry of the refractive index is critically liable to collapse. Loss of the wave-guided light may occur depending upon slight coupling between TM-like mode and TE-like mode. Therefore, a specific photonic crystal slab structure for easy fabrication is needed.

Fabrication of the photonic crystal slab having a refractive index distribution which is mirror-symmetrical in a thicknesswise direction is easy in case in which the refractive index of the medium atoms of the core is lower than that of the background medium. For simplicity of description, a crystal in which the refractive index of the medium atoms of the core is lower than that of the background will be hereinafter referred to as "hole type crystal" and below-mentioned crystal in which the refractive index of the medium atoms is higher than that of the background medium will be hereinafter referred to as "pillar-type crystal".

A hole-type photonic crystal slab is prepared by forming a plurality of circular holes in a triangular array in a membrane made of a semiconductor having a high refractive index of 3.5, such as silicon or gallium arsenide. The membrane is suspended with ends thereof supported. In this case, the air in the holes (refractive index is 1) is the medium atom and the semiconductor constitutes the core as the background medium. The air above and below the core serves as a dielectric material which plays a role of cladding.

Fabrication process is as follows: A photo resist mask which is formed with a plurality of holes arranged in a triangular lattice array is formed on a silicon thin film formed on a silicon oxide film by using the electron beam lithography.

Then, the photo resist mask pattern is transferred to the silicon thin film by an anisotropic dry etching using a fluorine based gas.

Then, the silicon oxide film under the silicon thin film is removed by wet etching using fluoric acid.

The silicon thin film should be vertically etched. This can be comparatively easily achieved if the thickness of the silicon thin film is about 1 μm (micro meter) or less. Even if part of the silicon oxide film which is an under-layer is etched during processing of the silicon thin film, no problem will occur since all of the silicon oxide film will be removed thereafter by wet etching. In such a manner, the refractive index distribution can be easily made mirror-symmetrical in a thicknesswise direction with a high precision for the hole-type photonic crystal slab which is slab type.

In case of a pillar-type photonic crystal slab, a membrane structure which uses the air as background medium cannot be implemented, since there is no way to suspend pillars which are medium atoms of the core, in the air.

Accordingly, a membrane structure is made by using a solid dielectric medium having intensity as the background medium of the core in lieu of the air. Alternatively, in order to avoid the adoption of the membrane, it is necessary to sandwich the solid medium atoms between solid claddings. In order to fabricate the former membrane type structure, a new step to fill among the medium atoms, a dielectric material which will become a background medium is newly necessary after fabrication of the medium atoms. In order to fabricate the latter structure in which the medium atoms is sandwiched between the solid claddings, a step to form cladding layer on the core layer is necessary after the formation of the core layer.

As mentioned above, means for implementing the photonic crystal slab having its refractive distribution which is mirror-symmetrical in a thicknesswise direction has been provided in the prior art.

[Patent Document 1] Japanese Patent Kokai Publication No. JP-P2003-0043277A (FIG. 1)

[Non-Patent Document 1] Solid Physics, Vol. 32. No. 11, 1977, 862 p

SUMMARY OF THE DISCLOSURE

However, it is not easy to realize a photonic crystal slab structure having its refractive index distribution which is mirror-symmetrical in a thicknesswise direction, said structure being endurable when it is used as a platform for the optical integrated circuit.

It has been described that the hole-type photonic crystal slab can be comparatively easily implemented as a membrane structure. In order to use the hole-type photonic crystal slab for the optical integrated circuit, a large circuit area is necessary. In this case, membrane type photonic crystal slab in which the core is suspended in the air is so less in mechanical intensity that it is not durable for practical use. Therefore, it is necessary to provide a structure in which the core is sandwiched between the solid claddings even if it is the hole-type photonic crystal slab.

In case of the pillar-type photonic crystal slab, membrane type structure is less in mechanical intensity than that of the hole-type photonic crystal slab. A structure in which the core is sandwiched between solid claddings is needed.

In conclusion, it is necessary to implement a structure in which the core is sandwiched between the solid claddings irrespective of whether the photonic crystal slab is hole-type or pillar-type. At this time, difficulty to obtain high manufacturing precision is a problem.

If a dielectric which will constitute the background medium is filled in a space among the medium atoms, it is liable to slightly leak in a depth of the core layer or to become thinner.

If so, it is impossible to obtain a core in which the medium atoms have a same thickness as that of the background medium, which is necessary for the prior art photonic crystal slab structure.

This means that the distribution of the refractive index will not become mirror-symmetrical in a thicknesswise direction in the prior art.

In such a manner, it is difficult to fabricate with a high precision the structure of the photonic crystal slab according to the prior art. Therefore, there is a problem that the yield of the manufacturing of the photonic crystal slab in which TM-like mode is completely separated from the TE-like mode is poor.

A problem that light is scattered into the cladding at the defect portion in which the periodicity of the refractive index distribution is lost in a light propagating direction so that wave-guided light will attenuate even if the TM-like mode is completely separated from TE-like mode.

Accordingly, it is a main object of the present invention to provide a photonic crystal structure in which TM-like mode is separated from TE-like mode and its manufacturing is easy.

It is another object of the present invention to provide a photonic crystal structure which is capable of compensating for the attenuation of wave-guided light or increasing the intensity of wave-guided light.

A photonic crystal structure in accordance with one aspect of the present invention which achieves the above-mentioned object is characterized in that said crystal comprises atomic dielectric pillars having a refractive index distribution and a structure which are mirror-symmetrical in a thicknesswise direction, said atomic dielectric pillars being arrayed in a two-dimensional lattice pattern to form a dielectric pillar lattice, said dielectric pillar lattice being disposed within a surrounding dielectric material having a refractive index distribution which is uniform or substantially uniform at least in a thicknesswise direction.

A photonic crystal structure in the other aspect of the present invention is characterized in that said crystal comprises a dielectric network having a refractive index distribution and a structure which are mirror-symmetrical in a thicknesswise direction, said dielectric network having a plurality of through-holes which are arrayed in a two-dimensional lattice pattern and are mirror-symmetrical in structure, said dielectric network being disposed within a surrounding dielectric material having a refractive index distribution which is uniform or substantially uniform at least in a thicknesswise direction.

In the present invention, said surrounding dielectric comprises two or more dielectrics having the same refractive indices, which are distributed asymmetrically in a thicknesswise direction. Such an arrangement makes processing of the above-mentioned two structures easier.

In the present invention, the surrounding dielectric may be an organic resin which may be simply referred to as resin, organic film or polymer. Such a photonic crystal structure makes it easier to form a film.

In the present invention, at least one of two or more dielectrics which are asymmetrically distributed in a thicknesswise direction may include an organic resin. Such a photonic crystal structure makes it easier to manufacture in respect of both processing and film formation.

In the present invention, the organic resin may be heat-curable or ultraviolet ray-curable resin. Such a photonic crystal structure makes it easier to form an organic film.

In the present invention, the atomic dielectric pillars are made of silicon and one of two or more dielectric materials may be silicon dioxide. Such a photonic crystal provides a photonic crystal structure by a matured silicon processing technology for fabrication.

In the present invention, the refractive index of the organic resin may be made less than 1.45 which is the refractive index of the silicon such a photonic crystal makes the confinement of light in a thicknesswise direction stronger.

In the present invention, the atomic dielectric pillars may be formed of a compound semiconductor. Such a photonic crystal structure can be used for light having a shorter wave length than silicon.

In a photonic crystal structure in a further aspect of the present invention, a photonic crystal structure has a refractive index distribution which is mirror-symmetrical in a thicknesswise direction and has a material distribution which is asymmetrical in a thicknesswise direction, and said crystal comprises a structure for changing the conditions applied to the photonic conditions and coupling between TM and TE-like mode is controlled by changing said conditions. Such a structure provides a photonic crystal optical functional device.

In the present invention, said conditions may include the wave length and intensity of light guided into said photonic crystal; the temperature of said photonic crystal; the electric field and current which is applied to said photonic crystal; the electric charge which is accumulated on the whole or part of said photonic crystal; and the external stress applied to said photonic crystal. Such a photonic crystal optical functional device can be easily controlled.

In the present invention, said photonic crystal optical functional device may function as one of an optical switch, resonator and wave length filter. Such a photonic crystal optical functional device implements a main functional element for optical integrated circuits.

A photonic crystal structure in a further aspect of the present invention comprises atomic dielectric pillars having a refractive index distribution and a structure which are mirror-symmetrical in a thicknesswise direction. Said atomic dielectric pillars are arrayed in a two-dimensional lattice pattern to form a dielectric pillar lattice. Said dielectric pillar lattice is disposed in a surrounding dielectric having a refractive index different from that of said dielectric pillars. Said photonic crystal comprises an organic material which is disposed in part or whole of said surrounding dielectric in a position around which the refractive index distribution and the structure are mirror-symmetrical in a thicknesswise direction of said photonic crystal; and a defect in which the refractive of part of said organic material is different from that of said organic material around said part of organic material in a direction parallel to the periodic plane of said dielectric pillar lattice. Such a structure provides a photonic crystal structure having a defect, which is easy to fabricate.

A photonic crystal structure in a further aspect of the present invention comprises a dielectric network having a refractive index distribution and a structure which are mirror-symmetrical in a thicknesswise direction. Said dielectric network has through-holes which are arrayed in a two-dimensional lattice pattern and are mirror-symmetrical in structure. Said dielectric network is disposed in a surrounding dielectric having a refractive index different from that of said dielectric network. Said photonic crystal comprises an organic material which is disposed in part or whole of said surrounding dielectric in a position around which the refractive index distribution and the structure are mirror-symmetrical in a thicknesswise direction of said photonic crystal; an defect in which the refractive of part of said organic material is different from that of said organic material around said part of organic material in a direction parallel to the periodic plane of said atomic dielectric network. Such a structure provides a photonic crystal structure having a defect, which is easy to fabricate.

A photonic crystal slab structure in a further aspect of the present invention comprises a plurality of medium atomic, each having a refractive index distribution and a structure which are mirror-symmetrical in a thicknesswise direction. Said medium atoms includes one or more materials. Said medium atoms are arrayed in a two-dimensional plane in a lattice pattern to form a medium atom lattice. Said medium atom lattice is surrounded by a background medium comprising one or more other materials. The refractive index distribution of the whole thereof is mirror-symmetrical in a thicknesswise direction. The whole or part of said medium atoms and said background media is doped with a photo-amplifying material. Such a photonic crystal slab structure is capable of amplifying once attenuated wave-guided light or confined light.

A photonic crystal slab structure in a further aspect of the present invention comprises a medium network having a refractive index distribution and a structure which are mirror-symmetrical in a thicknesswise direction. Said medium atoms network include one or more materials. Said medium network has a plurality of through-holes which are arrayed in a lattice pattern. Said medium network is surrounded by a background medium comprising one or more other materials. The refractive index distribution of the whole thereof is mirror-symmetrical in a thicknesswise direction. The whole or part of said medium network and said background medium is doped with an photo-amplifying material. Such a photonic crystal slab structure is capable of amplifying once attenuated wave-guided light or confined light.

In a photonic crystal structure in a further aspect of the present invention, the medium atoms may be multi-layered structure of silicon and silicon dioxide. The silicon dioxide is doped with a photo-amplifying material. The medium atoms are arrayed in a two-dimensional lattice media manner to form a medium atom lattice. The medium atom lattice is sandwiched between a first and second silicon films. Such a structure provides a photonic crystal structure which can be fabricated by a matured silicon process.

In a photonic crystal structure in a further aspect of the present invention, the medium atoms may be multi-layered structure of silicon and silicon dioxide. The silicon dioxide is doped with a photo-amplifying material. The medium atoms are arrayed in a two-dimensional lattice pattern to form a medium atom lattice. The medium atom lattice is sandwiched between a first and second silicon films. Such a structure provides a photonic crystal structure which can be fabricated by a matured silicon process.

In the present invention, the photo-amplifying material may preferably be a rare earth element. Such a structure provides a photonic crystal structure which is capable of amplifying light having a wave length used in optical communication.

In the present invention, the rare earth element may be erbium, thulium or praseodymium. Such a structure provides a photonic crystal structure which is capable of efficiently amplifying light having a wave length in C-band, B-band and 1.3 µ-band.

In the present invention, the medium atoms are made of silicon. Part of the background medium is a silicon dioxide film. The silicon dioxide film is in contact with the medium atom lattice on one side thereof. The other portion of the background medium is made of an organic resin. This structure provides a photonic crystal structure which makes its fabrication easier and has an amplifying function.

The meritorious effects of the present invention are summarized as follows.

In accordance with the present invention, a pseudo two-dimensional photonic crystal having the mirror-symmetry of the refractive index in a thicknesswise direction which is necessary to separate between TM-like mode and TE-like mode can be provided based upon a basic constitutional element in which a background dielectric surrounding atomic dielectric pillar lattice and a dielectric network in a easier and more economical manner compared with the prior art photonic crystal slab.

In accordance with the present invention, a photonic crystal structure having a defect which is remarkably easy to fabricate can be provided based upon a basic constitutional element in which an organic resin is used as part of the photonic crystal structure.

In accordance with the present invention, a photonic crystal structure which is capable of compensating for the attenuation of light and of an amplifying light can be provided based upon the basic constitutional element in which a photo-amplifying material is used as part of the photonic crystal.

Figure 1:
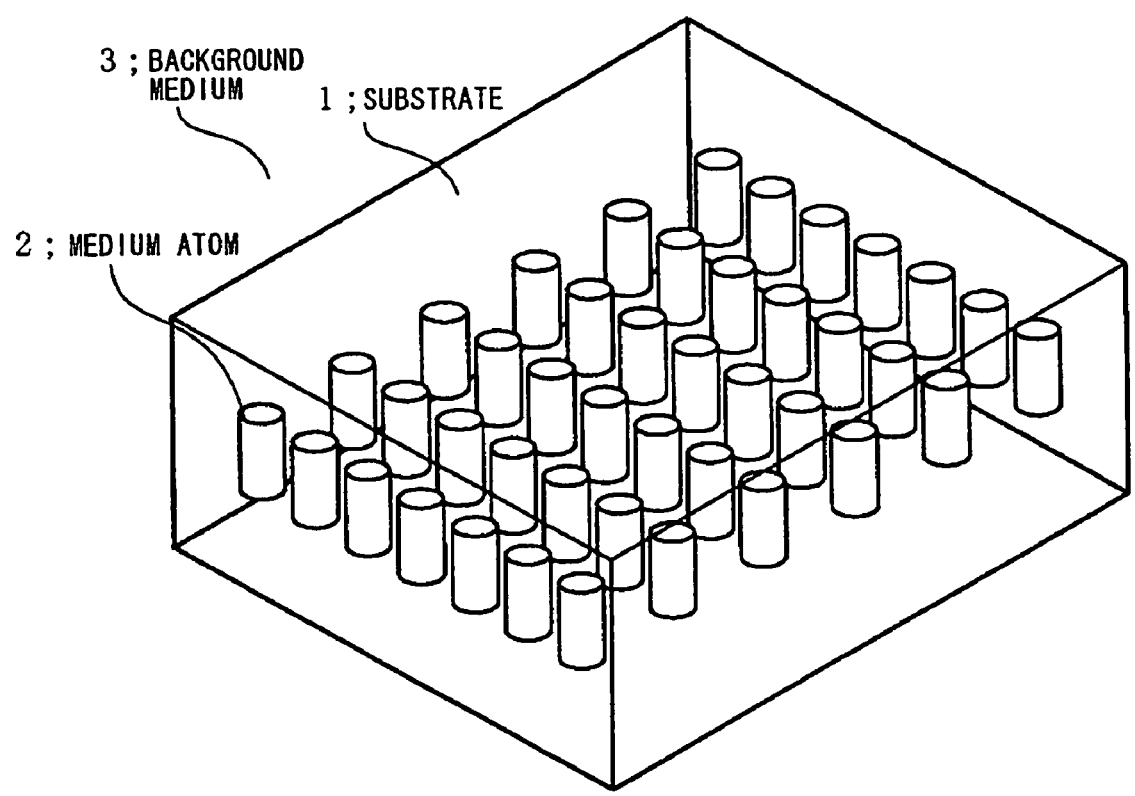
FIG. 1 is a schematic diagram of a photonic crystal structure according to the first mode of practicing the present invention as viewed in perspective.

1 surrounding dielectric
2 atomic dielectric pillars
3, 8 photonic crystals
4 dielectric pillar lattice
5, 11, 26, 28 organic resins
6, 10 silicon pillars
7, 9, 12 silicon dioxide film
13 photonic crystal slab
33 silicon pillar upper layer
34 silicon dioxide amplifying layer
35 silicon pillar lower layer

PREFERRED EMBODIMENTS OF THE INVENTION

Embodiments of the present invention will now be described with reference to the drawings to make the above-mentioned and other objects, features and advantages of the present invention more clear.

Figure 2:
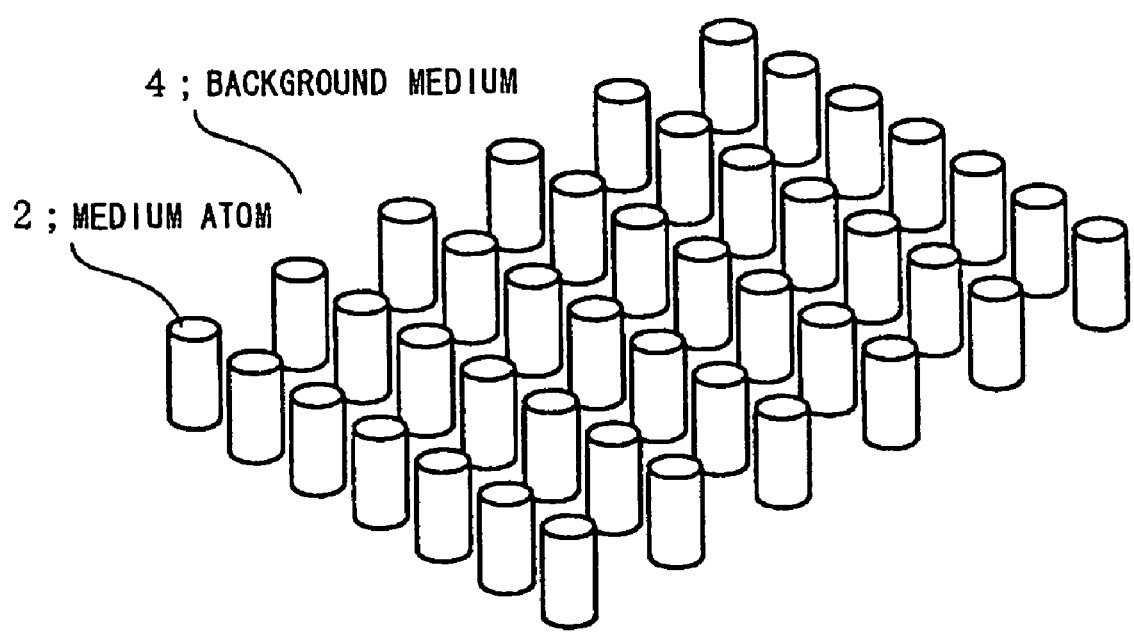
FIG. 2 is a schematic diagram of part of a component of the photonic crystal of FIG. 1 as diagramed in perspective.

FIG. 1 is a diagram illustrating a first mode of practicing the present invention and is a schematic diagram of a perspective view of a photonic crystal structure. FIG. 2 is a schematic diagram of a perspective view of a part of a component of the photonic crystal of FIG. 1.

Referring now to FIGS. 1 and 2, atomic dielectric pillars (medium atoms) have a refractive index distribution and a structure which are mirror-symmetrical in a thicknesswise direction and may include one or more materials. The section of the atomic dielectric pillars 2 taken along a plane normal to the thicknesswise direction may be in any shape. The section of the atomic dielectric pillars 2 taken in a thicknesswise direction may be in any shape provided that it is mirror-symmetrical. The atomic dielectric pillars 2 are arrayed in a two-dimensional lattice pattern for forming a dielectric pillar lattice 4 (background medium). The dielectric pillar lattice 4 is disposed in a surrounding dielectric material 1 having a refractive index which is uniform (the same value at a desired position) or substantially uniform. In other words, the surrounding dielectric 1 exists among above and below the atomic dielectric pillars 2. The surrounding dielectric 1 has a refractive distribution which is mirror-symmetrical in a thicknesswise direction and may be made of any material. That is, the surrounding dielectric 1 may be a composite structure made of a single material or a plurality of materials. The dielectric pillar lattice 4 may be any type such as square lattice, triangular lattice, honeycomb lattice type as well as quasi-crystal lattice which does not have translational symmetry, but rotational symmetry and lattice having no regularity.

The requirements of the mirror-symmetry of the refractive index distribution of the atomic dielectric pillars in a thicknesswise direction thereof and of uniform or substantially uniform refractive index distribution of the surrounding dielectric 1 may be satisfied under specific conditions. The specific conditions herein may include various conditions such as:

the wave length and intensity of light propagating through the photonic crystal, the wave length and intensity of light which is impinged upon the photonic crystal slab, the temperature of the photonic crystal slab, the electric field, current, electric charge, inner stress, external stress and the like, applied to the photonic crystal slab.

A photonic crystal structure comprising atomic dielectric pillars 2 which are arrayed in a two-dimensional lattice pattern is equivalent to the pillar-type photonic crystal structure. A first embodiment of the present invention corresponding to the hole-type photonic crystal is as follows:

The photonic crystal structure has a dielectric network which is mirror-symmetrical in its refractive index distribution and structure. The atomic dielectric network has through-holes which are arrayed in a two-dimensional lattice pattern and are mirror-symmetrical in structure in a thicknesswise direction thereof.

The photonic crystal of the present mode of practicing the invention has such a structure in which the dielectric network is disposed in the surrounding dielectric having a uniform or substantially uniform refractive index distribution.

It is the most important feature of the photonic crystal of the first mode of practicing the present invention that only mirror-symmetry of the refractive index in a thicknesswise direction is prescribed (defined) and a composite substance made of a plurality of materials is allowed as a medium which constitutes the photonic crystal. This is greatly different from the structure of the prior art photonic crystal slab in which the distribution (arrangement) of the material which constitutes the medium is prescribed.

Now, how the problem of the prior art is solved by the differences in definition (the present invention: mirror symmetry of the refractive index distribution in a thicknesswise direction, prior art: distribution of the material constituting the medium) will now be described. The following examples will be described with reference to only a practicing mode corresponding to the above-mentioned pillar-type crystal. The same is in principle applied to examples of an practicing mode corresponding to the hole-type crystal.

Figure 3A:
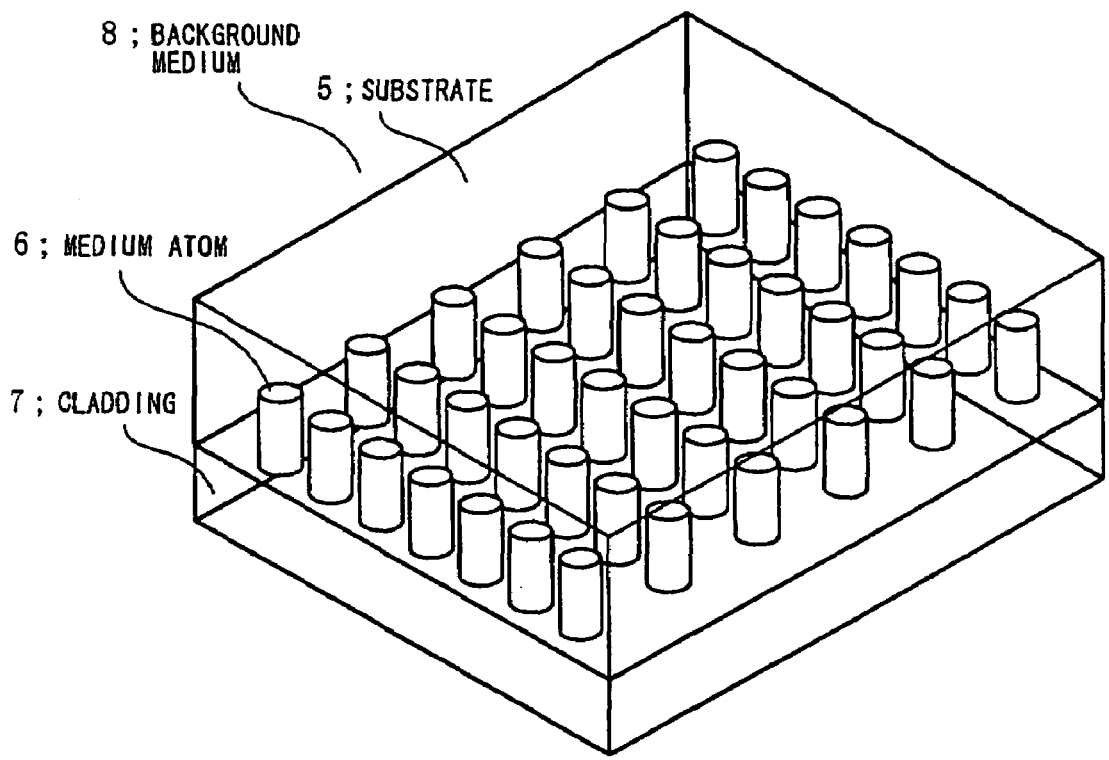
FIG. 3A is a diagram of the photonic crystal of the first embodiment of the first mode of practicing the present invention, as viewed in perspective.
Figure 3B:
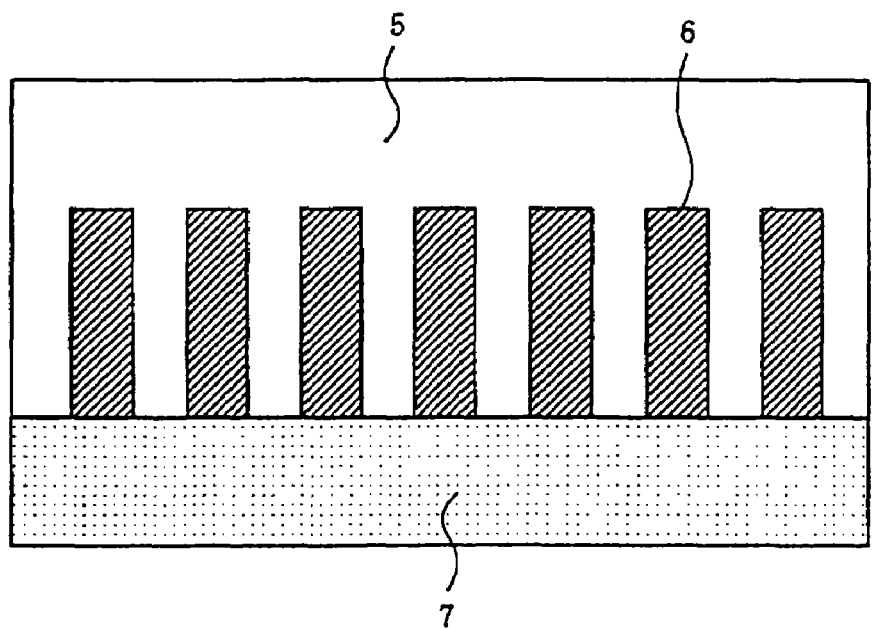
FIG. 3B is a diagram schematically showing the section of the photonic crystal as viewed in a lateral direction.

FIG. 3A is a schematic diagram explaining the first embodiment of the first mode of practicing the present invention and showing the photonic crystal as viewed in perspective. FIG. 3B is a view showing the section of the photonic crystal of FIG. 3A as viewed in a lateral direction. Silicon pillars 6 each having a diameter of 0.2 μm and a height of 0.5 μm are arrayed on a silicon dioxide film 7 in a square lattice pattern. The lattice constant is 0.4 μm. A polymethyl methacrylate based organic resin 5 is filled in a space among a multiplicity of silicon pillars 6 and there-above. The silicon dioxide film 7 has a refractive index of 1.45 and the organic resin 5 also has the same refractive index of 1.45.

Since the refractive index distribution of the photonic crystal is mirror-symmetrical although its material distribution is asymmetrical in a thicknesswise direction thereof, the wave-guide mode of the photonic crystal 8 is separated into TM-like mode and TE-like mode.

Of course, if silicon dioxide is used like the silicon dioxide film 7 in lieu of the organic resin 5, the material distribution then becomes symmetrical. Available deposition techniques for forming a film of silicon oxide includes, for example, thermal CVD (chemical vapor deposition), plasma CVD and sputtering and it is difficult to fill silicon dioxide into a space among silicon pillars which are spaced at 0.4 µm without causing voids by any one of these deposition technique.

In contrast to this, organic resin can be applied by spin-coating liquid monomer and then curable by subsequent heating or ultra-violet ray irradiation. Therefore, it can be easily filled in space among the silicon pillars 6 without causing voids.

Alternatively, in lieu of applying the organic resin 5 by spin-coating, a structure in which silicon pillars 6 are formed on the silicon dioxide film 7 may be applied on a liquid organic resin film which has been applied on a separate substrate and may subsequently be cured by exposure to heat or ultra-violet rays.

In such a manner, the structure of the photonic crystal of the first mode of practicing the present invention is capable of simultaneously achieving the isolation between TM-like mode and TE-like mode and remarkably easy fabrication.

It goes without saying that a point defect or line-defect can be introduced into the photonic crystal 8 by making some of silicon pillars 6 larger or smaller.

Choice of the organic resin 5 is not restricted if its refractive index can be adjusted to a desired value. It may be epoxy resin or polyimide having a high heat resistance as well as polymethacrylate.

Compound semiconductors which have band gaps (not photonic band gap) larger than silicon and which are excellent in bonding ability with silicon dioxide and in workability, such as gallium arsenic, aluminum arsenic, aluminum gallium arsenic, gallium nitride, indium gallium arsenic phosphorus and indium phosphorus may be used for the silicon pillars 6, if light having a wave length shorter than that of light which is transmissible through silicon is used.

The silicon dioxide 7 of the photonic crystal 8 is etched with fluoric acid so that it is removed. Thereafter a resin which is the same as the organic resin 5 is applied and cured. Thus, a photonic crystal structure in which the silicon pillars 6 are disposed in the organic resin having a uniform refractive index can be fabricated.

An advantage of the structure is that an organic resin having a refractive index which is lower than that of silicon dioxide (refractive index is 1.45) can be used. This enables light to be tightly confined in the vicinity of the atomic dielectric pillars. In FIG. 3B, a reference 6 denotes the section of the dielectric network and organic resin 5 is filled in a space among the sections of dielectric network at positions corresponding to holes in case of the hole-type photonic crystal.

The silicon pillars 6 are in contact with the silicon oxide film 7 at only one of ends thereof. Although the silicon pillars 6 are buried in the organic resin 5, the photonic crystal structure has an insufficient intensity as a whole, since the organic resin is inferior in intensity to the silicon dioxide film. An example which is applicable in this case will now be described.

Figure 4A:
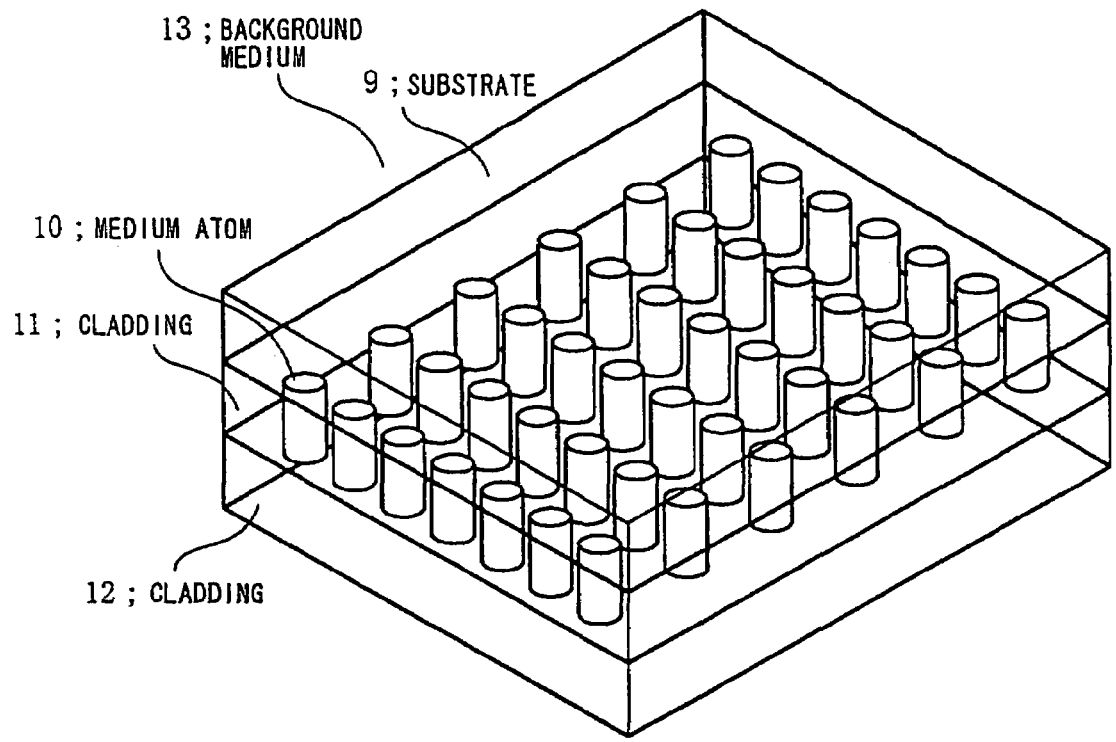
FIG. 4A is a diagram of the photonic crystal according to the second embodiment of the first mode of practicing the present invention, as viewed in perspective explaining.
Figure 4B:
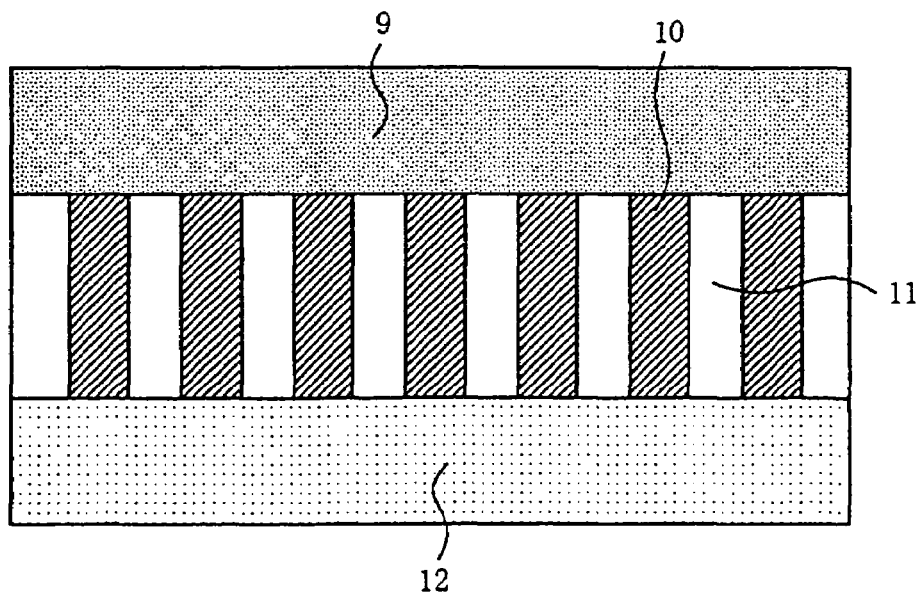
FIG. 4B is a diagram schematically showing the section of the photonic crystal as viewed in a lateral direction.

FIG. 4A is a schematic diagram explaining a second embodiment of the first mode of practicing the present invention and showing a photonic crystal as viewed in perspective. FIG. 4B is a view showing the cross section of the photonic crystal of FIG. 4A.

Silicon pillars 10, each having a diameter of 0.2 µm and a height of 0.7 µm are arrayed on silicon oxide film 12 in a square lattice pattern. The lattice constant is 0.4 µm. A polymethacrylate based organic resin 11 is filled in a space among the silicon pillars 10 to the same thickness as that of the silicon pillars 10.

A silicon dioxide film 9 is disposed on the silicon pillars 10 and the organic resin 11. The organic resin 11 has a refractive index of 1.45 which is the same as those of the silicon dioxide film 12 and silicon dioxide film 9.

Since the photonic crystal slab 13 is supported at upper and lower positions by means of the silicon dioxide films 9 and 12 which has a intensity higher than that of the organic resin 11, it has a higher mechanical intensity than that of the photonic crystal 8 of FIG. 3A which is secured at only one of the ends of the silicon pillars by means of silicon dioxide.

Figure 15:
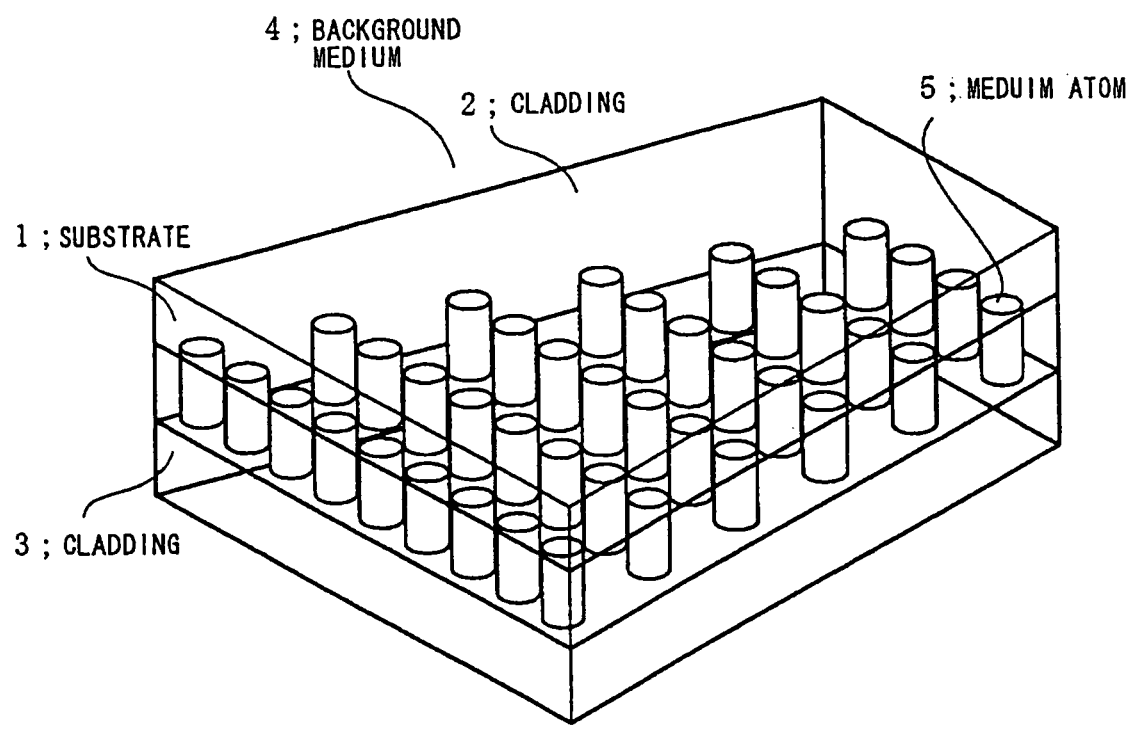
FIG. 15 is a schematic diagram explaining the structure of a prior art photonic crystal slab.

In actual fact, the photonic crystal slab 13 shown in FIG. 4A is equivalent to a photonic crystal slab in the prior art shown in FIG. 15 which is modified so that the upper and lower claddings are made of the medium having the same refractive index as that of the background medium of the core. In this meaning, the structure of the photonic crystal slab 13 may be obtained by restricting the refractive index of the medium in the structure of the prior art photonic crystal slab.

Since the silicon dioxide film 12 and silicon dioxide film 9 are made of the same material in the photonic crystal slab 13 shown in FIG. 4A, the distribution of the refractive index of the photonic crystal slab 13 is mirror-symmetrical in a thicknesswise direction as well as the material distribution. Accordingly, the mirror-symmetry of the refractive index distribution in a thicknesswise direction of the photonic crystal slab 13 is not lost even if the manner of change in the refractive index of the photonic crystal slab 13 is different depending upon the material, and this holds even when a voltage is applied thereto.

In contrast to this, the photonic crystal 8 shown in FIG. 3A has a refractive index distribution which is mirror-symmetrical in a thicknesswise direction and has a material distribution which is not mirror-symmetrical. Accordingly, if the refractive index of the organic resin 5 is changed by the applied voltage, the refractive index distribution of the photonic crystal 8 becomes non mirror-symmetrical in a thicknesswise direction. As a result, TM-like mode is coupled with TE-like mode although they are separated to each other prior to the change in refractive index. Use of this phenomenon implements an optical functional element in which the coupling between TM mode and TE mode is controlled by conditions such as a voltage applied to the photonic crystal.

Coupling between TM-like mode and TE-like mode is caused and the properties of the photonic band gap and wave-guide mode which can be used only in TM-like mode or TE-like mode is caused to disappear by changing the conditions such as the wave length and/or intensity of light introduced into the photonic crystal, wave length and/or intensity of light with which the photonic crystal is irradiated, temperature of the photonic crystal, electric field and current which are applied to the photonic crystal, electrostatic charge which is applied on all or some of the photonic crystal, and external stress applied on the photonic crystal. An optical switch in which light guiding which is active when TM-like mode is separated from TE-like mode can be brought into inactive by the above mentioned condition changing process can be implemented. A resonator, the Q-value of which can be controlled, or a wave length filter can be implemented by using the foregoing operation principle.

The organic resin 11 has a thickness which is equal to a height of the silicon pillars 10 in a phonic crystal slab 13 having a high intensity shown in FIG. 4A. Since it is difficult to apply the organic resin 11 to the same thickness of the silicon pillars 10 in sin coating from an initial stage in the course of fabricating this structure, the organic resin 11 is first formed to have a thickness larger than the height of the silicon pillars 10 and the thickness is reduced to the height of the silicon pillars by an etch back process using oxygen plasma. Thus, this structure is fabricated.

In this case, it is not necessarily easy to precisely align the thickness of the organic resin with the height of the silicon pillars by etch back process. Also, it is very difficult to apply the organic resin in a uniform thickness in particular when the substrate is rough on its surface.

Figure 5:
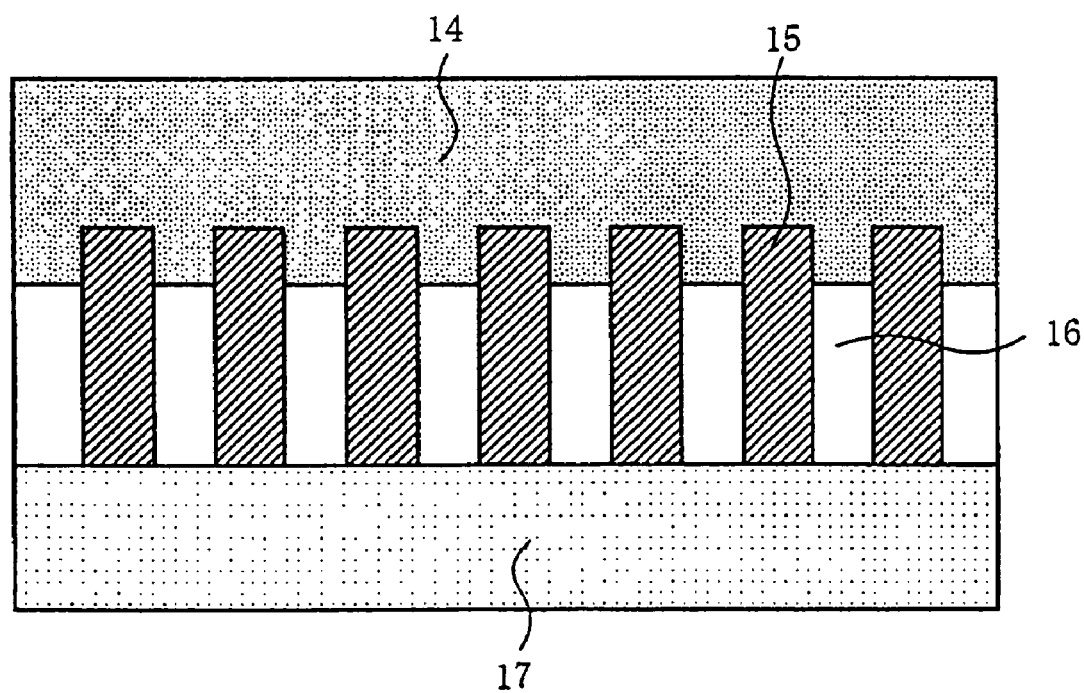
FIG. 5 is a diagram schematically showing the section of the photonic crystal according to the third embodiment of the first mode of practicing the present invention.
Figure 6:
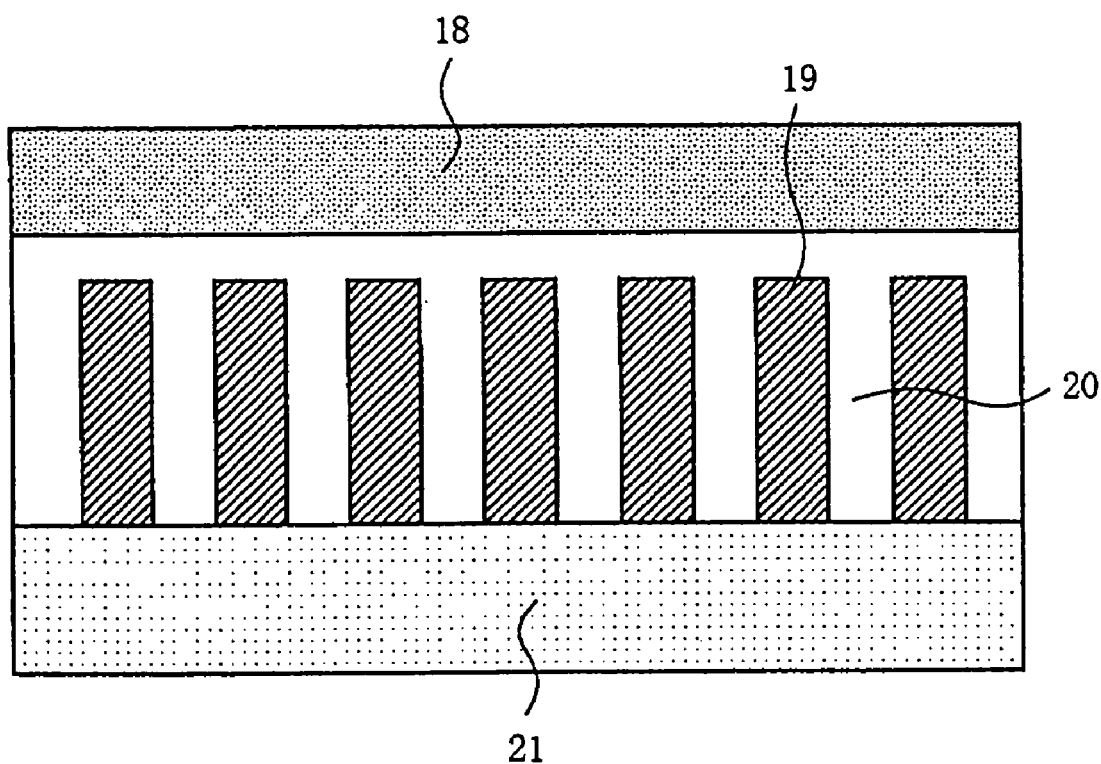
FIG. 6 is a diagram schematically showing the section of the photonic crystal according to the fourth embodiment of the first mode of practicing the present invention.

As a result, a portion having a section shown in FIG. 5 or FIG. 6 may be formed in some locations in course of fabrication of the photonic crystal slab 13 shown in FIG. 4A.

It has been described that the photonic crystal slab 13 is a limited structure of the prior art. It is the most serious problem of the prior art structure that a desired structure can not necessarily be realized due to variations in fabrication.

Figure 7:
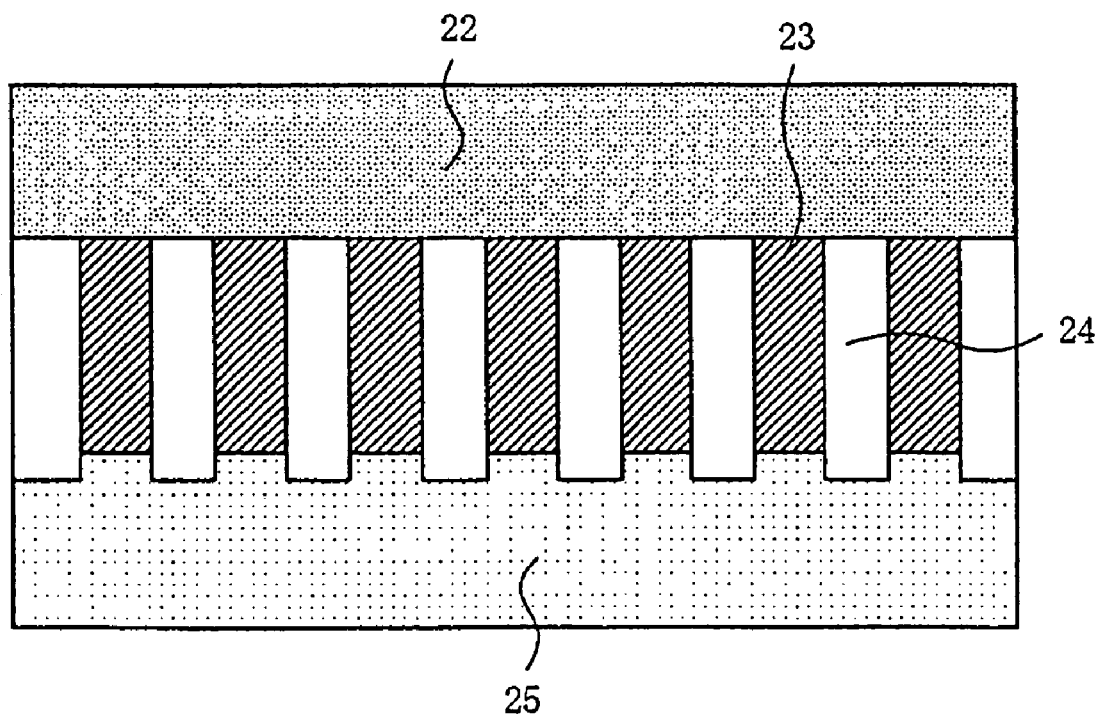
FIG. 7 is a diagram schematically showing the section of the photonic crystal according to the fifth embodiment of the first mode of practicing the present invention.

Even structures which are shown in FIG. 4 as well as those shown in FIGS. 5 through 7 can be all considered as optically equivalent structure if they are a structure of the first mode of practicing the Invention. In any of structures, TM-like mode is separated from TE-like mode. This respect will be described in detail with reference to each of the examples. In FIG. 4B, a reference numeral 10 denotes the section of the dielectric network of the hole-type photonic crystal.

FIG. 5 is a sectional view of a photonic crystal explaining a third embodiment of the first mode of practicing the present invention. FIG. 6 is a sectional view of a photonic crystal explaining a fourth embodiment of a first mode of practicing the present invention.

The photonic crystal shown in FIG. 5 is fabricated when the thickness of the organic resin film becomes less than the height of the silicon pillars in the fabrication process of the photonic crystal slab 13 shown in FIG. 4A. That is, the organic resin 16 has a film thickness smaller than the height of the silicon pillars 15.

In contrast to this, the photonic crystal shown in FIG. 6 is fabricated when the thickness of the organic resin film becomes larger than the height of the silicon pillars in the course of fabrication of the photonic crystal slab 13 shown in FIG. 4A.

Both of the photonic crystals shown in FIGS. 5 and 6 have a distribution of the dielectric material which is not mirror-symmetrical in a thicknesswise direction. It is symmetrical in a thicknesswise direction. It is obvious that these structures are different from that of the prior art photonic crystal slab shown in FIG. 15.

If the refractive indices of the silicon dioxide films 14 and 17 are different from that of the organic resin 16 in FIG. 5, the refractive index distribution of the photonic crystal having a section shown in FIG. 5 becomes non mirror-symmetrical in a thicknesswise direction.

Similarly, if the refractive indices of the silicon dioxide films 18 and 21 are different from that of the organic resin 20 in FIG. 6, the refractive index distribution of the photonic crystal having a section shown in FIG. 6 becomes non mirror-symmetrical in a thicknesswise direction.

In accordance with the first mode of practicing the present invention, the refractive index of the silicon dioxide films 14 and 17 is equal to that of the organic resin 16 in FIG. 5. The surrounding dielectric of the photonic crystal of FIG. 5 (silicon oxide films 14 and 17 and organic resin 16) has a refractive index which is uniform in a thicknesswise direction. As a result, the distribution of the refractive index of the whole of the photonic crystal becomes mirror-symmetrical in a thicknesswise direction. While in FIG. 5, a reference numeral 15 denotes the silicon pillar of the pillar-type photonic crystal, the reference numeral 15 denotes the section of the dielectric network in case of the hole-type photonic crystal.

Similarly, each of the refractive indices of the silicon dioxide films 18 and 21 is equal to that of the organic resin 20 in FIG. 6. The surrounding dielectric of the photonic crystal of FIG. 6 (silicon oxide films 18 and 21 and organic resin 20) has a refractive index which is uniform in a thicknesswise direction. As a result, the distribution of the refractive index of the whole of the photonic crystal becomes mirror-symmetrical in a thicknesswise direction. While in FIG. 6, a reference numeral 19 denotes the section of the silicon pillar of the pillar-type photonic crystal, the reference numeral 19 denotes the section of the dielectric network in case of the hole-type photonic crystal.

Considering only the refractive index distribution, it is obvious that the photonic crystals of FIGS. 5 and 6 are equivalent to the photonic crystal slab 13 of FIG. 4A. This means that the fabrication yield of the photonic crystal slab is drastically improved. For the photonic crystal slab which is used for light having a wave length of 1.5 μm and 1.3 μm which is in the range of optical communication wave length, the height of the silicon pillars is often not higher than about 0.5 μm.

If the refractive index of the organic resin is different from that of the silicon dioxide which is located beneath and above the organic resin, it is necessary to make the thickness of the organic resin to be filled not higher than at least 3% of the height of the silicon pillars in order to provide sufficient isolation between TM and TE-like modes. It is necessary to control the thickness of the organic resin with the absolute value not more than ±15 nm.

However, the surface of the substrate to be coated with a resin is not flat since silicon pillars having a height of 0.5 μm are formed thereon. Considering it is almost impossible to form an organic resin film on such a rough substrate at a film thickness precision of ±15 nm, the performance equivalent to that of the photonic crystal slab can be achieved only by the present invention.

The present invention is also applicable to overcome the problems other than control of the film thickness of the organic resin to be filled.

FIG. 7 is a sectional view of a photonic crystal slab explaining a fifth embodiment of the first mode of practicing the present invention. The photonic crystal shown in FIG. 7 is fabricated when there is a problem at a step of fabricating silicon pillars in the process of producing the photonic crystal slab 13 of FIG. 4A.

In the photonic crystal slab 13 shown in FIG. 4A, silicon pillars 10 are disposed on the silicon dioxide film 12. The silicon pillars are formed by a process comprising the steps of forming a resist pattern of triangular or square lattice on a silicon thin film which is deposited on a silicon dioxide film by using electron beam lithography and then transferring the resist pattern to the silicon thin film by anisotropic dry etching. At a final stage of the anisotropic dry etching of the silicon thin film, the surface of the silicon dioxide film therebelow is exposed. This silicon dioxide film should not be etched in the process of the dry etching.

However, in practice, the silicon dioxide under the silicon thin film may be slightly etched. This happens mainly due to the non-uniformity of an etching characteristic (etching rate) over a substrate surface which is an inherent characteristic of etching apparatus. Besides, due to so-called loading effect or micro-loading effect in which the etching rate and etching selection ratio depend upon the area to be etched.

The silicon dioxide film 25 of the photonic crystal of FIG. 7 is in the above-mentioned state. The silicon dioxide film 25 is etched at around the lower ends of the silicon pillars 23. Even if the silicon dioxide film 22 as upper layer cladding is formed completely flat, the distribution of the material contribution of the material constituting the photonic crystal slab in a thicknesswise direction becomes non mirror-symmetrical.

If silicon dioxide is used as a medium among silicon pillars or a medium of a material having the same refractive index as that of the silicon dioxide is filled in accordance with a first mode of practicing the present invention, the distribution of the refractive index can be made mirror-symmetrical. Of course, an organic resin can be used as the medium 24 among the silicon pillars.

Although, mainly the organic resin has been described as a material to be filled in a space among the silicon pillars in the foregoing examples, materials other than organic resin, such as silicon oxide nitride having a refractive index higher than that of silicon dioxide and a intensity which is substantially equal to that of silicon dioxide and also silicon fluoric oxide having a refractive index less than that of silicon dioxide may be filled. A mechanism which solves the problem of the prior art as described in foregoing examples is same as that when a material other than organic resin is filled.

As mentioned above, it is an organic resin 11 that is filled in a space among the atomic dielectric pillars 10 in the photonic crystal slab 13 which has been described with reference to FIG. 4A. The organic resin generally has such a property that the bonds among the bonded atoms which constitute the resin are partly lost or initially unbonded atoms will be bonded to each other on exposure to high energy rays such as X-rays or gamma-rays.

Use of this property of the organic resin allows the refractive index only at a portion of the organic resin 11 of the photonic crystal slab 13, to which the high energy ray is irradiated, to be lowered or elevated. A defect or defects can be introduced in the perfect photonic crystal slab 13 having initially no defect by X-ray lithography and the like. A reference numeral 23 in FIG. 7 denotes the section of a dielectric network in case of hole-type photonic crystal.

Figure 8:
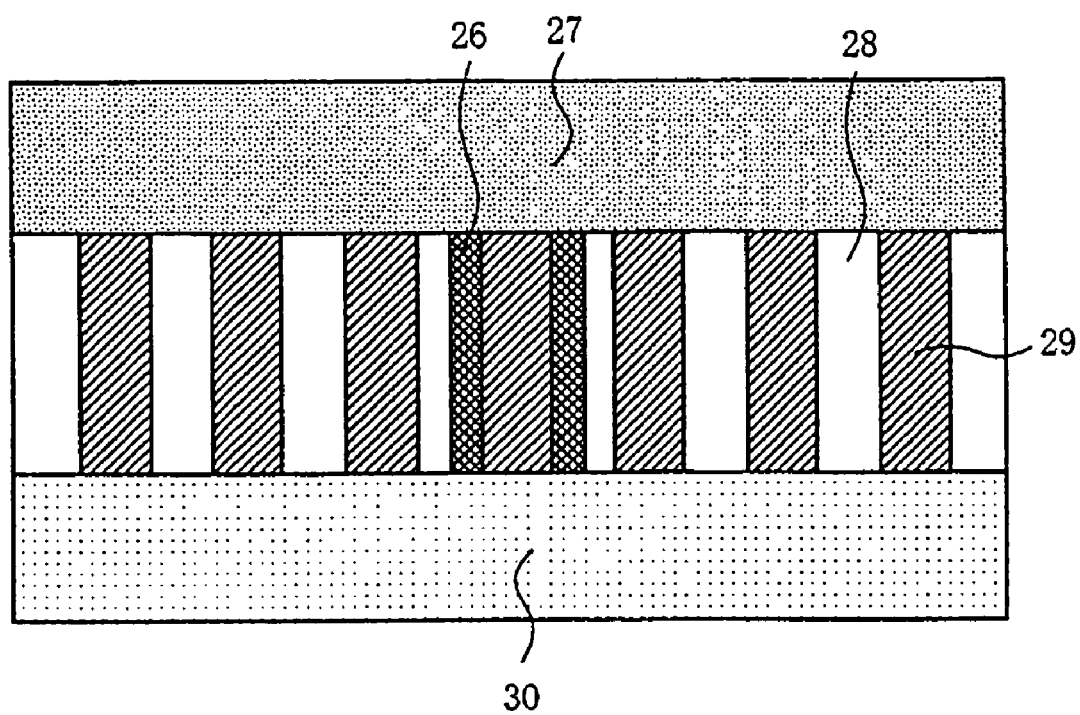
FIG. 8 is a diagram schematically showing the section of a photonic crystal slab having a defect in accordance with the sixth embodiment of the first mode of practicing the present invention.

FIG. 8 is a sectional view showing a photonic crystal slab having a defect which is fabricated by such a process. FIG. 8 is a view explaining a sixth embodiment of the first mode of the present invention.

As shown in FIG. 8, a square lattice of silicon pillars 29 is disposed on a silicon dioxide film 30 and an organic resin 28 is filled in a space among the silicon pillars 29. Another silicon dioxide film 27 is disposed on the silicon pillars 29 and organic resin 28. Although the refractive index of the organic resin 28 is 1.45 which is equal to that of the silicon dioxide films 30 and 27, the refractive index of the organic resin 26 is as low as 1.25.

The photonic crystal slab of FIG. 8 has a defect. The refractive index distribution of the photonic crystal slab including the defect is mirror-symmetrical in a thicknesswise direction thereof.

The organic resin 26 is made by irradiating the organic resin 28 with X-rays from an upper position in X-ray lithography. X-rays which are radiated from an upper position are transmitted through all silicon dioxide film 27, silicon pillars 29, organic resin 28, and silicon dioxide film 30 in the irradiation position without being scattered. At this time, the organic resin 28 is transformed into the organic resin 26 due to change in its refractive index. The refractive indices of the silicon dioxide films 27 and 30 do not change since the bonds between atoms which constitute them is strong. As a result of this, the photonic crystal slab having the sectional structure shown in FIG. 8 can be fabricated.

For photonic crystal having a defect shown in FIG. 8, the refractive index of the organic resin 28 should not necessarily be the same as those of the silicon dioxide 30 and 27. It is essential that the organic resin 26 has a refractive index which is different from that of the organic resin 28.

A photonic crystal which has a defect shown in FIG. 8 comprises atomic dielectric pillars having a refractive index distribution and a structure which are mirror-symmetrical in a thicknesswise direction. The atomic dielectric pillars are arrayed in a two-dimensional lattice pattern to form a dielectric pillar lattice. The dielectric pillar lattice is disposed in a surrounding dielectric having a refractive index different from that of said dielectric pillars. The photonic crystal comprises an organic material which is disposed in part or whole of said surrounding dielectric in a position around which the refractive index distribution and the structure are mirror-symmetrical in a thicknesswise direction of said photonic crystal, and a defect in which the refractive of part of said organic material is different from that of said organic material around said part of organic material in a direction parallel to the periodic plane of said dielectric pillar lattice. A reference numeral 29 in FIG. 8 denotes a dielectric network in case of hole-type photonic crystal.

This is a definition in case of the pillar-type crystal. A hole-type photonic crystal comprises a dielectric network having a refractive index distribution and a structure which are mirror-symmetrical in a thicknesswise direction. The dielectric network has through-holes which are arrayed in a two-dimensional lattice pattern and are mirror-symmetrical in structure. The dielectric network is disposed in a surrounding dielectric having a refractive index different from that of said dielectric network. The photonic crystal comprises an organic material which is disposed in part or whole of said surrounding dielectric in a position around which the refractive index distribution and the structure are mirror-symmetrical in a thicknesswise direction of said photonic crystal, and a defect in which the refractive of part of said organic material is different from that of said organic material around said part of organic material in a direction parallel to the periodic plane of said atomic dielectric network. In FIG. 8, a reference numeral 29 denotes a dielectric network in case of hole-type photonic crystal.

As is apparent from the foregoing description, the dielectric medium made of the other organic material may be used in lieu of silicon dioxide 27 and 30. If an inorganic medium is used, no change of a refractive index of the inorganic medium occurs on exposure to high energy rays.

Contrarily, some other organic resin may be used in lieu of silicon dioxide 27 and 30. The refractive index of the organic resin should not necessarily be the same as that of the organic resin 28.

The kind of defect is not restricted. Accordingly, point defect, line-defect and combination thereof may be used.

If an organic resin which has the same refractive index as that of the organic resin 28 and exhibits same change in the refractive index as that of the organic resin 28 on exposure to high energy rays is used in lieu of the silicon dioxide 27 and 30, the mirror-symmetry of the refractive index distribution in a thicknesswise direction can be readily obtained as mentioned above even when variations in fabrication process occur.

A fabrication process comprising the steps of initially providing a perfect photonic crystal slab and then causing a defect in the slab by high energy ray irradiation lithography such as X-ray lithography is made possible so that the same advantage as the gate array of integrated circuit can be obtained. Use of photonic crystal slabs which are common irrespective of an optical circuit which is desired to fabricate is made possible, resulting in a remarkable reduction in fabrication cost.

Now, a second mode of practicing the present invention will be described.

As mentioned above, a requirement that the refractive index distribution of the photonic crystal slab be mirror-symmetrical in a thicknesswise direction is to separate the wave-guide mode into TM-like mode and TE-like mode. If TM-like mode is coupled with TE-like mode, light will be leaked into TE-like mode in which no confinement of light occur, because confinement of light in a defect portion was possible due to photonic band gap in only TM-like mode. Therefore, TM-like mode light which is transmitted through a line-defect wave guide, or confined in the defect will be attenuated due to loss.

A photonic crystal structure in which TM-like mode and TE-like mode are separated in the first mode of practicing the present invention relating to the photonic crystal slab while a photonic crystal structure which his capable of amplifying again, the attenuated wave-guided light or confined light is provided in the second mode of practicing the present invention.

A photonic crystal slab structure according to the second mode of practicing the present invention comprises a plurality of medium atoms, each having a refractive index distribution and a structure which are mirror-symmetrical in a thicknesswise direction, said medium atoms including one or more materials. The medium atoms are arrayed in a two-dimensional surface in a lattice pattern to form a medium atom lattice. The medium atom lattice is surrounded by a background medium comprising one or more other materials, and the refractive index distribution of the whole thereof is mirror-symmetrical in a thicknesswise direction. The whole or part of said medium atoms and said background media is doped with an photo-amplifying material.

The foregoing is applied to the pillar-type crystal. A photonic crystal slab structure of the hole-type according to the second mode of practicing the present invention comprises a medium network having a refractive index distribution and a structure which are mirror-symmetrical in a thicknesswise direction. The medium network includes one or more materials. The medium network has a plurality of through-holes which are arrayed in a lattice pattern. The medium network is surrounded by a background medium comprising one or more other materials, and the refractive index distribution of the whole thereof is mirror-symmetrical in a thicknesswise direction. The whole or part of the medium atoms and background medium is doped with a photo-amplifying material.

A second mode of practicing the present invention will be described in detail with reference to the drawings.

Figure 9:
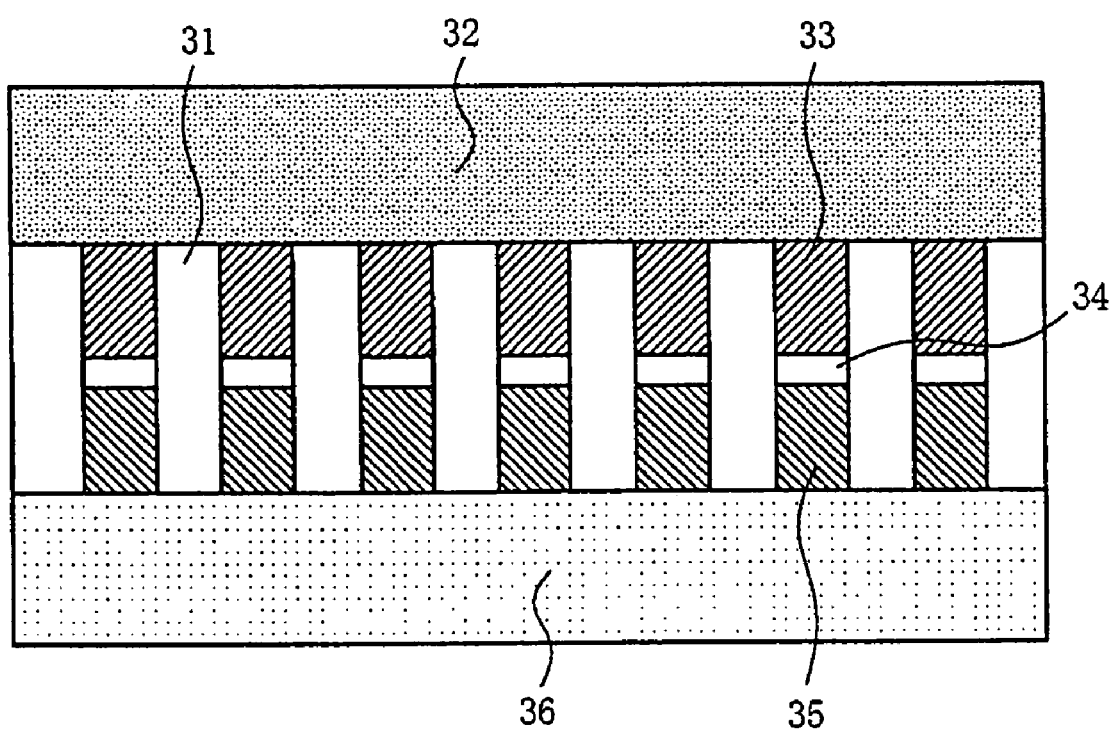
FIG. 9 is a diagram schematically showing the section of a photonic crystal slab according to the first embodiment of the second mode of practicing the present invention.

FIG. 9 is a sectional view of a photonic crystal slab explaining a first embodiment of the second mode of practicing the present invention.

The atomic dielectric pillar comprises three layers such as a silicon pillar upper layer 33, a silicon dioxide amplifying layer 34 and a silicon pillar lower layer 35. The silicon pillar upper layer 33 and silicon pillar lower layer 35 have the same height of 0.3 μm. The silicon dioxide amplifying layer 34 has a thickness of 0.1 μm. The medium atomic pillars are circular in section and have a diameter of 0.2 μm. The atomic dielectric pillars are arrayed in a square lattice having a lattice constant of 0.4 μm, so that they form an atomic dielectric pillar lattice. The atomic dielectric pillar lattice is sandwiched between the silicon dioxide films 32 and 36. A space among the atomic dielectric pillars is filled with an organic resin 31. The silicon dioxide films 32 and 36 and the silicon dioxide amplifying layer 34 have a refractive index of 1.45. The silicon dioxide amplifying layer 34 as a photo-amplifying medium is doped with thulium, which is a rare earth element at 5%. The organic resin 31 is prepared so that it has a refractive index of 1.30. In case of hole-type photonic crystal, a reference numeral 35 denotes the section of the dielectric medium network.

The distribution of the refractive index of the photonic crystal slab of FIG. 9 meets the requirement of the mirror-symmetry in a thicknesswise direction.

The optical energy of the wave-guide mode of the photonic crystal slab having the section of FIG. 9 is concentrated in the vicinity of the atomic dielectric pillar lattice. Although reduction in the diameter of some of the atomic dielectric pillars may introduce spot or line-defect into the photonic crystal slab having the section shown in FIG. 9, the energy of light which is confined in these defects is concentrated in the vicinity of the atomic dielectric pillar lattice with respect to the thicknesswise direction also in this case. The energy of light is concentrated in the vicinity of the atomic dielectric pillars also in both cases in which light is propagated in a wave-guide mode of the photonic crystal slab per se and in which light is confined in the defect portion of the photonic crystal slab. Because the silicon dioxide amplifying layer 34 is located in the position where the energy of light is concentrated, it effectively interacts with wave-guided light or confined light.

The photonic crystal slab of this structure amplifies light as follows: When the photonic crystal slab of FIG. 9 is irradiated with light having a wave length of 1.4 μm as excitation light in a thicknesswise direction from an upper position, irradiation of light generates population inversion in the energy level of ions of thulium which is doped to the silicon dioxide amplifying layer 34. As light which is wave-guided or confined in the photonic crystal slab interacts with thulium ions, an amplifying operation which is highly effective for the light having a wave length of 1.48 to 1.51 μm can be achieved.

The photo-amplifying material may include other rare earth elements than thulium, such as erbium or place odium.

The refractive index of the organic resin 31 may be made 1.45 which is the same as those of silicon dioxide films 32 and 36. In this case, a structure of the photonic crystal slab is one obtained on adding the photo-amplifying material to the structure of the first mode of practicing the present invention, so that separation between TM-like mode and TE-like mode and amplification of light intensity can be easily achieved simultaneously.

In case of photonic crystal slab of FIG. 89, each of the atomic dielectric pillars comprises a single silicon dioxide amplifying layer 34 which is sandwiched between upper and lower silicon pillars. The present invention is as a matter of course not limited to this structure. The atomic dielectric pillar comprises two or more silicon dioxide amplifying layers as long as the refractive index distribution of the atomic dielectric pillars is mirror-symmetrical in a thicknesswise direction.

Thulium is doped when it is desired to amplify light in an S-band (wave length of 1460 to 1530 nm) which is one of optical communication wave length bands. Erbium is doped when it is desired to amply light in C-band (wave length of 1530 to 1565 nm) which is longer wave length band than S-band. Excitation light having a wave length of 0.98 µm may be used in case of the addition of erbium. If the silicon dioxide amplifying layer 34 is sandwiched by silicon like the photonic crystal slab of the structure of FIG. 9 at this time, a problem will occur. Since silicon does not transmit excitation light having a wave length of 0.98 µm, supply of excitation light to the silicon dioxide amplifying layer 34 can not be conducted well. A photonic crystal structure which is capable of solving this problem will now be described.

Figure 10:
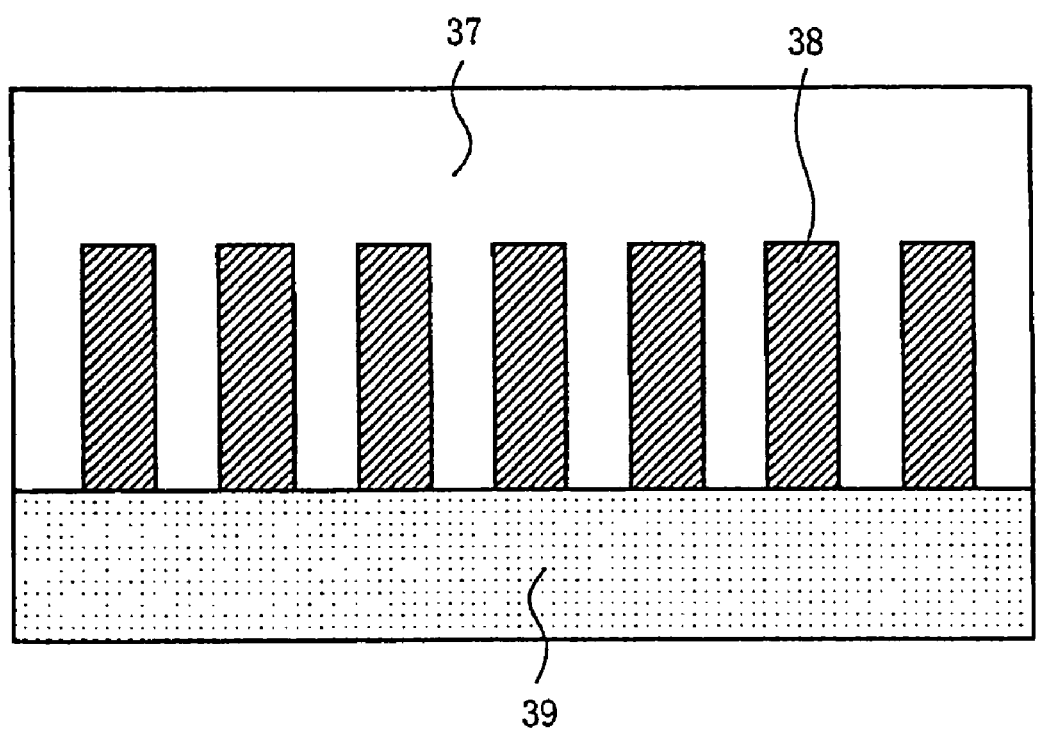
FIG. 10 is a diagram schematically showing the section of a photonic crystal slab according to the second embodiment of the second mode of practicing the present invention.

FIG. 10 is a schematic diagram showing the section of the photonic crystal for explaining a second embodiment of the second mode of practicing the present invention. The photonic crystal of FIG. 10 is substantially identical with the photonic crystal shown in FIG. 3 in structure. That is, silicon pillars 38 are arrayed on a silicon dioxide film 39 in a square lattice pattern. A space among and above a multiplicity of silicon pillars 38 which constitute a square lattice is filled with an organic resin 37 which is prepared so that it has the same refractive index of 1.45 as that of the silicon dioxide film 39. The organic resin may include any material such polymethacrylate, epoxy and polyimide as long as its refractive index can be adjusted to be the same as that of the silicon dioxide film 39.

In view of the structure of the previously described photonic crystal comprising the photo-amplifying material, the photonic crystal shown in FIG. 10 is such that the medium atom is made of silicon, part of the background medium is made of silicon dioxide film, the silicon dioxide film is in contact with the medium atom lattice on the one side thereof and the other part of the background medium is made of an organic resin.

The photonic crystal of FIG. 10 is different in structure from the photonic crystal of FIG. 3 in that the silicon dioxide film 39 is doped with erbium at 5%. Irradiation of the photonic crystal with excitation light having a wave length of 0.98 µm in a thicknesswise direction of the crystal from the side of the silicon dioxide film 39 effectively generates population inversion in the energy level of the erbium ions.

Most of the energy of wave-guided light propagating through the photonic crystal slab is concentrated in a lattice layer which is formed by the silicon pillars 38. Some of the energy distributes as evanescent filed into the silicon dioxide film 39. Accordingly, wave-guided light which interacts with erbium ions in the population inversion will be amplified. A reference numeral 38 in FIG. 10 denotes the section of the dielectric network in case of hole-type photonic crystal.

The organic resin 37 may be doped with erbium at 5% in lieu of the addition of erbium into the silicon dioxide film 39. In this case, erbium may be blended into the organic resin 37 as a metal complex. This structure has an advantage that the manufacturing is easy.

Both the organic resin 37 and silicon dioxide film 39 may as a matter of course be doped with erbium so that the sectional area at which light will interact with erbium is increased for enhancing the amplifying efficiency. Since the organic resin is able to form a film at a low temperature, an organic pigment which will be decomposed at high temperature, such as rhodamine may be used as the photo-amplifying material which is to be doped to the organic resin 37.

Figure 11:
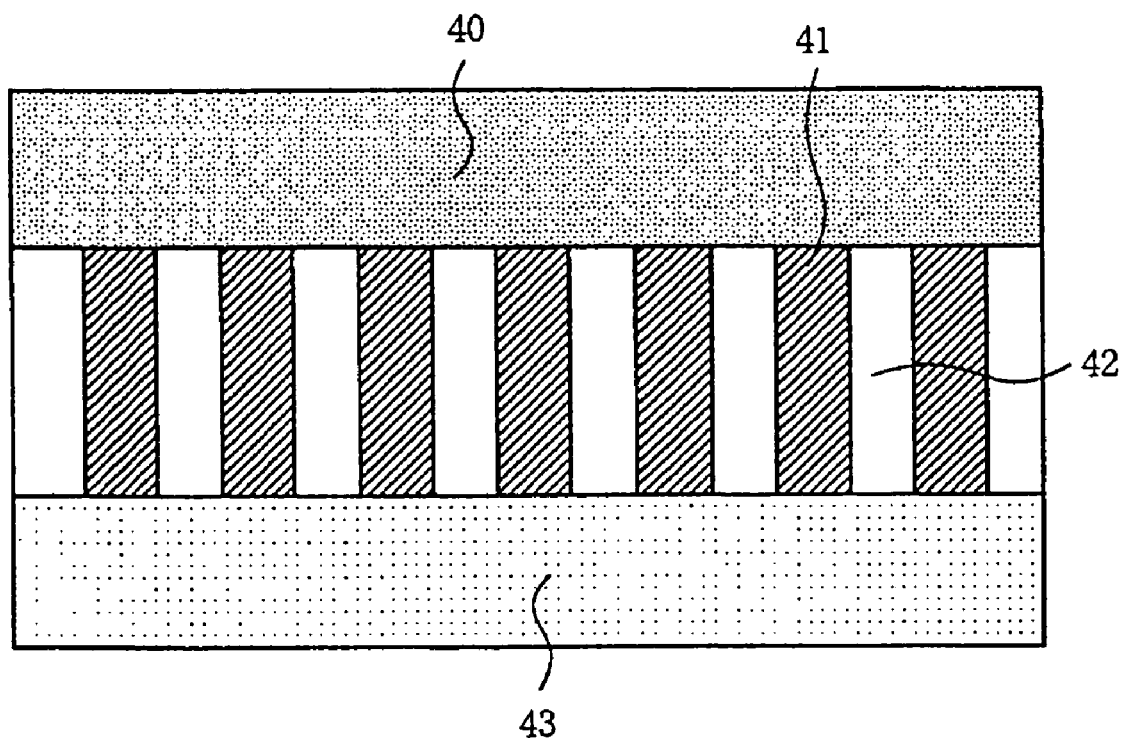
FIG. 11 is a diagram schematically showing the section of a photonic crystal slab according to the third embodiment of the second mode of practicing the present invention.

Similarly, FIG. 11 is a view schematically showing the section of the structure of the photonic crystal slab for explaining a third embodiment of the second mode of practicing the present invention. The photonic crystal slab of FIG. 11 is substantially identical in structure with the photonic crystal slab of FIG. 4. Silicon pillars 41 are arrayed on a silicon dioxide film 43 in a square lattice pattern. A space among the silicon pillars 41 is filled with an organic resin 42 to the same thickness (height) as the silicon pillars 41. A silicon dioxide film 40 is disposed on the silicon pillars 41 and the organic resin 42.

The photonic crystal slab of FIG. 11 is different in structure from that of FIG. 4 in that at least one of the silicon dioxide films 43 and 40 is doped with erbium at 5%. If both are doped with erbium, wave-guided light can be effectively amplified by irradiating the photonic slab with excitation light having a wave length of 0.98 µm in a thicknesswise direction from both sides of the silicon dioxide films 40 and 43.

It is of course that more efficient amplification can be conducted if the organic resin 42 is also doped with erbium. There is an advantage that both sufficient amplification efficient and easy fabrication can be achieved if only the organic resin 42 is doped with erbium.

An organic pigment, which is typically of rhodamine pigment may be used as the photo-amplifying material which is to be doped to the organic resin 42.

The structure of the photonic crystal of FIG. 11 is superior to that of FIG. 10 with respect of mechanical intensity although the former structure is complicated.

Unlike the photonic crystal of FIG. 4, it is not necessary that the refractive index of the organic resin 42 be the same as that of the silicon dioxide film 43 or 40. If the refractive index of the organic resin is made equal to that of the silicon dioxide films, it is superior in that the fabrication of the photonic crystal structure can be made easier. A reference numeral 41 in FIG. 11 denotes the section of the dielectric network in case of hole-type photonic crystal.

Figure 12:
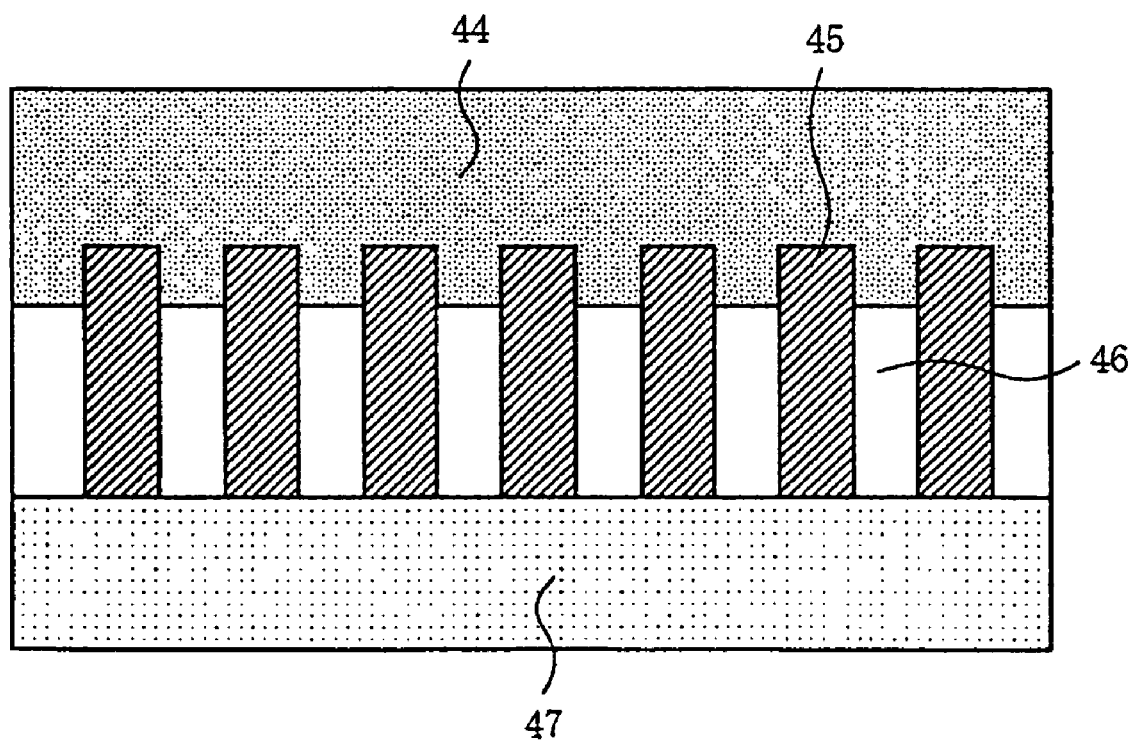
FIG. 12 is a diagram schematically showing the section of a photonic crystal slab according to the fourth embodiment of the second mode of practicing the present invention.
Figure 13:
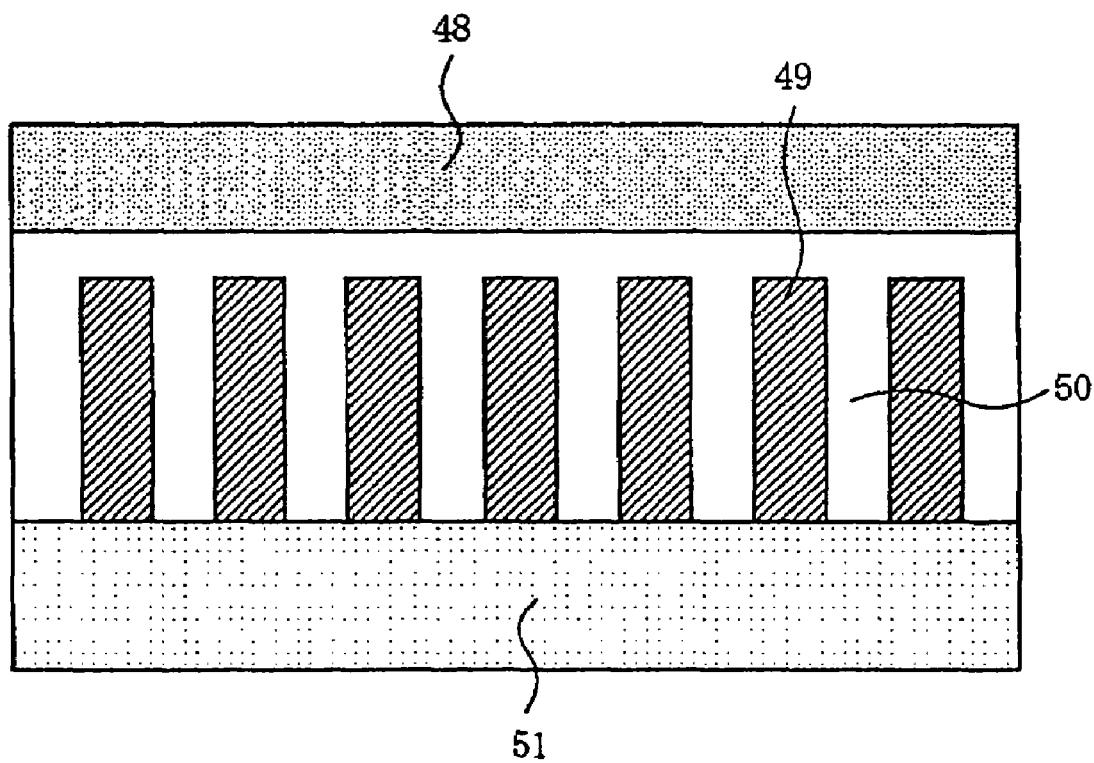
FIG. 13 is a diagram schematically showing the section of a photonic crystal slab according to the fifth embodiment of the second mode of practicing the present invention.
Figure 14:
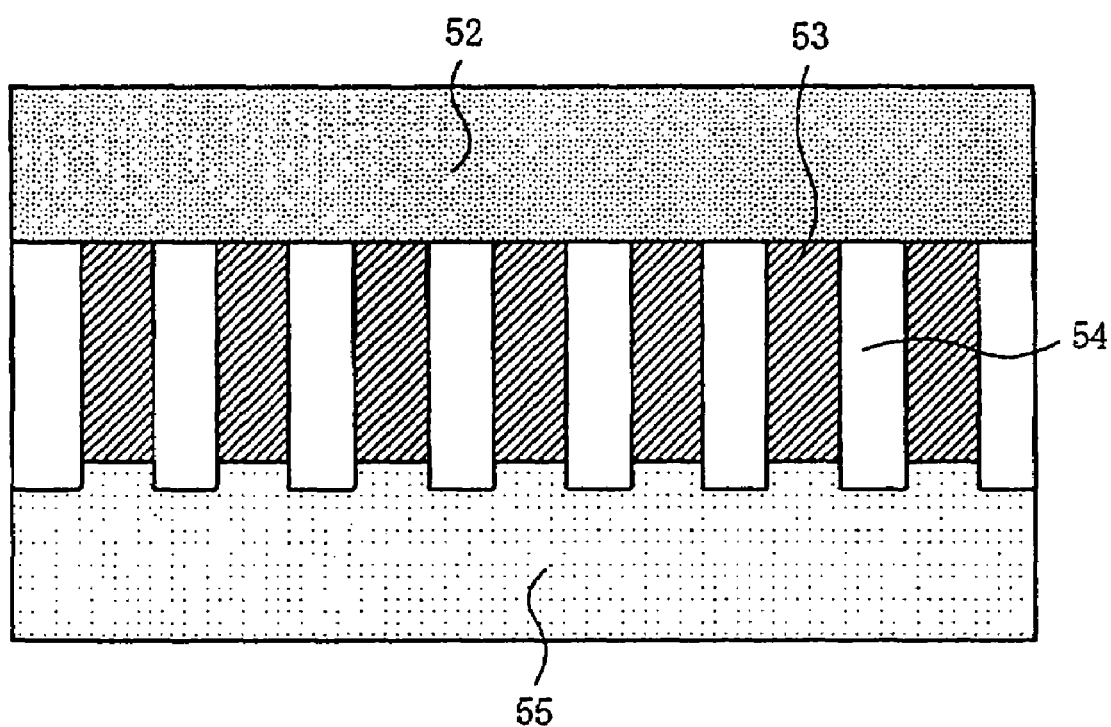
FIG. 14 is a diagram schematically showing the section of a photonic crystal slab according to the sixth embodiment of the second mode of practicing the present invention.

FIGS. 12, 13 and 14 are views of phonic crystals explaining a fourth, fifth and sixth examples of the second mode of practicing the present invention, respectively. The photonic crystals are substantially identical in structure with those of FIGS. 5, 6 and 7 except that the silicon dioxide film is doped with erbium.

In other words, at least one of the silicon dioxide films 47 and 44 is doped with erbium. If the organic resin 46 is also doped with erbium, more efficient amplification can be achieved. If only the organic resin 46 is doped with erbium, manufacturing becomes easier.

An organic pigment may be used as a photo-amplifying material which is to be doped to the organic resin 46.

In the structure of FIG. 13, at least one of the silicon dioxide films 51 and 48 is doped with erbium. If an organic resin 50 is also doped with erbium, more efficient amplification can be achieved. If only the organic resin 50 is doped with erbium, manufacturing becomes easier. An organic pigment may be used as a photo-amplifying material to be doped to the organic resin 50.

In other words, at least one of the silicon dioxide films 47 and 44 is doped with erbium. If the organic resin 46 is also doped with erbium, more efficient amplification can be achieved. If only the organic resin 46 is doped with erbium, manufacturing becomes easier.

An organic pigment may be used as a photo-amplifying material which is to be doped to the organic resin 46.

The structures of FIGS. 12, 13 and 14 are a modification relating to the process of manufacturing the structure of FIG. 11 as mentioned in the description of the first embodiment of the present invention (refer to FIGS. 5, 6 and 7). In case of hole-type photonic crystal, reference numerals 45, 49 and 53 in FIGS. 12, 13 and 14 denote sections of dielectric network.

Although erbium is used as an example of rare earth element to be doped in the description of the photonic crystal description of FIGS. 10, 11, 12, 13 and 14, other rare earth element such as thulium or praseodymium may be used.

The present invention is not limited to the foregoing examples. It is obvious that the examples may be modified within the spirit and scope of the technical concept of the present invention as defined in Claims.

The phase "the refractive index is mirror-symmetrical" or "the refractive index distribution has mirror-symmetry" used herein is assumed to include those having ±3% error (6% error margin) in addition to strict meaning since the refractive index or shape per se of the material which constitutes the photonic crystal has an error of this order due to the manufacturing tolerance. Also in this case, advantage of the present invention can be provided.

Similarly, the phrase "uniform refractive index distribution" means that the refractive index distribution has ±3% error (6% error margin). A phrase "substantially uniform" refractive index distribution means that the refractive index distribution has ±5% error (10% error margin). If the refractive index distribution has ±5% error, an advantage of the present invention which is slightly less can be provided.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A photonic crystal comprising:
  a plurality of atomic dielectric pillars, each having a refractive index distribution and a structure which are both mirror-symmetrical in a thicknesswise direction of said photonic crystal, said plurality of atomic dielectric pillars being arrayed in a two-dimensional lattice pattern to form a dielectric pillar lattice; and
  a surrounding dielectric material in which said dielectric pillar lattice is disposed, said surrounding dielectric material having a refractive index distribution which is uniform at least in the thicknesswise direction.

2. A photonic crystal comprising:
  a dielectric network having a refractive index distribution and a structure which are both mirror-symmetrical in a thicknesswise direction of said photonic crystal, said dielectric network having a plurality of through-holes which are arrayed in a two-dimensional lattice pattern and are mirror-symmetrical in structure; and
  a surrounding dielectric material in which said dielectric network is disposed, said surrounding dielectric material having a refractive index distribution which is uniform at least in the thicknesswise direction.

3. A photonic crystal comprising:
  a plurality of atomic dielectric pillars, each having a refractive index distribution and a structure which are both mirror-symmetrical in a thicknesswise direction of said photonic crystal, said plurality of atomic dielectric pillars being arrayed in a two-dimensional lattice pattern to form a dielectric pillar lattice; and
  a surrounding dielectric material in which said dielectric pillar lattice is disposed, said surrounding dielectric material having a refractive index distribution which is substantially uniform at least in the thicknesswise direction.

4. A photonic crystal comprising:
  a dielectric network having a refractive index distribution and a structure which are both mirror-symmetrical in a thicknesswise direction of said photonic crystal, said dielectric network having a plurality of through-holes which are arrayed in a two-dimensional lattice pattern and are mirror-symmetrical in structure; and
  a surrounding dielectric material in which said dielectric network is disposed, said surrounding dielectric material having a refractive index distribution which is substantially uniform at least in the thicknesswise direction.

5. The photonic crystal according to claim 1, wherein said surrounding dielectric comprises two or more dielectrics having the same refractive indices, which are distributed in the thicknesswise direction.

6. The photonic crystal according to claim 1, wherein said surrounding dielectric comprises an organic resin.

7. The photonic crystal according to claim 5, wherein at least one of said two or more dielectrics comprises an organic resin.

8. The photonic crystal according to claim 6, wherein said organic resin comprises a heat-curable or ultraviolet ray-curable resin.

9. The photonic crystal according to claim 7, wherein said atomic dielectric pillars comprises silicon; and
  wherein one of said two or more dielectrics is silicon dioxide.

10. The photonic crystal according to claim 6 wherein said organic resin has a refractive index which is less than 1.45.

11. The photonic crystal according to claim 1, wherein said atomic dielectric pillars comprise a compound semiconductor.

12. A photonic crystal optical functional device comprising:
  a photonic crystal having a refractive index distribution which is mirror-symmetrical in a thicknesswise direction of said photonic crystal, said photonic crystal having a material distribution which is asymmetrical in the thicknesswise direction; and
  means for controlling coupling between TM and TE-like mode by changing given conditions which are set for said photonic crystal.

13. The photonic crystal optical functional device according to claim 12, wherein said conditions comprises at least one of
  wave length and intensity of wave-guided light in said photonic crystal;
  temperature of said photonic crystal;
  electric field and current applied to said photonic crystal;

electric charge accumulated on the whole or part of said photonic crystal; and external stress applied to said photonic crystal.

14. The photonic crystal optical functional device according to claim 12, wherein said photonic crystal optical functional device functions as one of an optical switch, resonator and wave length filter.

15. A photonic crystal comprising:
a plurality of atomic dielectric pillars, each having a refractive index distribution and a structure which are both mirror-symmetrical in a thicknesswise direction of said photonic crystal;
said atomic dielectric pillars being arrayed in a two-dimensional lattice pattern to form a dielectric pillar lattice; and
a surrounding dielectric material in which said dielectric pillar lattice is disposed, said surrounding dielectric having a refractive index different from that of said dielectric pillars,
said photonic crystal further comprising:
an organic material disposed in part or whole of said surrounding dielectric material in a position around which the refractive index distribution and the structure are mirror-symmetrical in the thicknesswise direction of said photonic crystal; and
a defect in which the refractive index of part of said organic material is different from that of said organic material around said part of organic material in a direction parallel to the periodic plane of said dielectric pillar lattice.

16. A photonic crystal comprising:
a dielectric network having a refractive index distribution and a structure which are both mirror-symmetrical in a thicknesswise direction of said photonic crystal;
said dielectric network having through-holes which are arrayed in a two-dimensional lattice pattern and are mirror-symmetrical in structure; and
a surrounding dielectric in which said dielectric network being disposed, said surrounding dielectric having a refractive index different from that of said dielectric network;
said photonic crystal further comprising:
an organic material disposed in part or whole of said surrounding dielectric material in a position around which the refractive index distribution and the structure is mirror-symmetrical in the thicknesswise direction of said photonic crystal; and
a defect in which the refractive of part of said organic material is different from that of said organic material around said part of organic material in a direction parallel to the periodic plane of said atomic dielectric network.

17. A photonic crystal structure having a photonic crystal slab structure comprising:
a plurality of medium atoms, each having a refractive index distribution and a structure which are both mirror-symmetrical in a thicknesswise direction of said photonic crystal;
said medium atoms including one or more materials;
said medium atoms being arrayed in a two-dimensional plane in a lattice pattern to form a medium atom lattice; and
a background medium for surrounding said medium atom lattice, said background medium comprising one or more other materials, the refractive index distribution of the whole thereof being mirror-symmetrical in the thicknesswise direction;
wherein the whole or part of said medium atoms and said background media is doped with an photo-amplifying material.

18. A photonic crystal structure having a photonic crystal slab structure comprising:
a medium network having a refractive index distribution and a structure which are both mirror-symmetrical in a thicknesswise direction of said photonic crystal structure,
said medium network including one or more materials, said medium network having a plurality of through-holes which are arrayed in a lattice pattern; and
a background medium for surrounding said medium network, said background medium comprising one or more other materials, the refractive index distribution of the whole thereof being mirror-symmetrical in the thicknesswise direction, wherein the whole or part of said medium network and said background medium is doped with an photo-amplifying material.

19. The photonic crystal structure according to claim 17, wherein said medium atoms are a multi-layered structure of silicon and silicon dioxide; said silicon dioxide being doped with an photo-amplifying material;
said medium atoms being arrayed in a two-dimensional lattice pattern to form a medium atom lattice;
said medium atom lattice being sandwiched between first and second silicon dioxide films.

20. The photonic crystal structure according to claim 18, wherein said medium network is a multi-layered structure of silicon and silicon dioxide; said silicon dioxide being doped with an photo-amplifying material;
said medium network having a plurality of through-holes which are arrayed in a two-dimensional lattice pattern;
said medium network being sandwiched between first and second silicon dioxide films.

21. The photonic crystal structure according to claim 19, wherein said photo-amplifying material is a rare earth element.

22. The photonic crystal structure according to claim 21, wherein said rare earth element is at least one of erbium, thulium and praseodymium.

23. The photonic crystal structure according to claim 17, wherein said medium atoms is silicon;
part of said background medium being a silicon dioxide film;
said silicon dioxide film being in contact with said medium atom lattice on one side thereof; and
the other part of said background medium including an organic resin.

24. The photonic crystal structure according to claim 18, wherein said medium network is silicon;
part of said background medium being a silicon dioxide film;
said silicon dioxide film being in contact with said medium network on one side thereof; and
the other part of said background medium including an organic resin.

25. The photonic crystal structure comprising:
a first dielectric layer;
a dielectric pillar lattice comprising a plurality of dielectric pillars, said plurality of dielectric pillars provided on said first dielectric layer and arrayed in a two-dimensional lattice pattern; and
a second dielectric layer provided on said first dielectric layer and filled in at least a space among said dielectric pillars; and said second dielectric layer comprising an organic resin; and said first dielectric layer has the same refractive index as that of said second dielectric layer.

26. The photonic crystal structure comprising:
a first dielectric layer;
a dielectric pillar lattice comprising a plurality of dielectric pillars, said plurality of dielectric pillars provided on said first dielectric layer and arrayed in a two-dimensional lattice pattern; and
a second dielectric layer provided on said first dielectric layer and filled in at least a space among said dielectric pillars; and
said second dielectric layer comprising an organic resin; and
said structure further comprises a third dielectric layer on said second dielectric layer; and
said first dielectric layer has the same refractive index as that of said second dielectric layer.

27. A photonic crystal structure comprising:
a first dielectric layer;
a dielectric pillar lattice comprising a plurality of dielectric pillars, said plurality of dielectric pillars provided on said first dielectric layer and arrayed in a two-dimensional lattice pattern;
a second dielectric layer provided on said first dielectric layer and filled in at least a space among said dielectric pillars; and
a third dielectric layer provided on said second dielectric layer;
wherein said first dielectric layer has the same refractive index as that of said second dielectric layer.

28. A photonic crystal structure comprising:
a first dielectric layer;
a dielectric pillar lattice comprising a plurality of dielectric pillars, said plurality of dielectric pillars provided on said first dielectric layer and arrayed in a two-dimensional lattice pattern;
a second dielectric layer provided on said first dielectric layer and filled in at least a space among said dielectric pillars; and
a third dielectric layer provided on said second dielectric layer;
wherein said first, second and third dielectric layers have the same refractive indices.

29. A photonic crystal structure comprising:
a first dielectric layer;
a dielectric pillar lattice comprising a plurality of dielectric pillars, said plurality of dielectric pillars provided on said first dielectric layer and arrayed in a two-dimensional lattice pattern; and
a second dielectric layer provided on said first dielectric layer and filled in at least a space among said dielectric pillars; and
said second dielectric layer comprising an organic resin; and
said structure further comprises a third dielectric layer on said second dielectric layer; and
said dielectric pillars have their ends opposite to said first dielectric layer side, which extend into said third dielectric layer or remain within said second dielectric layer.

30. A photonic crystal structure comprising:
a first dielectric layer;
a dielectric pillar lattice comprising a plurality of dielectric pillars, said plurality of dielectric pillars provided on said first dielectric layer and arrayed in a two-dimensional lattice pattern; and
a second dielectric layer provided on said first dielectric layer and filled in at least a space among said dielectric pillars; and
said second dielectric layer comprising an organic resin; and
said dielectric pillars have their ends on the side of said first dielectric layer, which is above the interface between said first and second dielectric layers.

31. A photonic crystal structure comprising:
a first dielectric layer;
a dielectric pillar lattice comprising a plurality of dielectric pillars, said plurality of dielectric pillars provided on said first dielectric layer and arrayed in a two-dimensional lattice pattern; and
a second dielectric layer provided on said first dielectric layer and filled in at least a space among said dielectric pillars; and
said second dielectric layer comprising an organic resin, wherein the dielectric pillars comprise a photo-amplifying material.

32. A photonic crystal structure comprising:
a first dielectric layer;
a dielectric pillar lattice comprising a plurality of dielectric pillars, said plurality of dielectric pillars provided on said first dielectric layer and arrayed in a two-dimensional lattice pattern; and
a second dielectric layer provided on said first dielectric layer and filled in at least a space among said dielectric pillars; and
said second dielectric layer comprising an organic resin, wherein the first dielectric layer comprises a photo-amplifying material.

33. A photonic crystal structure comprising:
a first dielectric layer;
a dielectric pillar lattice comprising a plurality of dielectric pillars, said plurality of dielectric pillars provided on said first dielectric layer and arrayed in a two-dimensional lattice pattern; and
a second dielectric layer provided on said first dielectric layer and filled in at least a space among said dielectric pillars; and
said second dielectric layer comprising an organic resin, wherein the first and/or third dielectric layer comprises a photo-amplifying material.

34. A photonic crystal structure
a first dielectric layer;
a dielectric network provided on said first dielectric layer, said dielectric network comprising a plurality of through-holes which are arrayed in a two-dimensional lattice pattern; and
a second dielectric layer provided on said first dielectric layer, said second dielectric layer being filled in at least said through-holes; and
said second dielectric layer comprising an organic resin; and
said first dielectric layer has the same refractive index equal to that of said second dielectric layer.

35. A photonic crystal structure comprising:
a first dielectric layer;
a dielectric network provided on said first dielectric layer, said dielectric network comprising a plurality of through-holes which are arrayed in a two-dimensional lattice pattern; and a second dielectric layer provided on said first dielectric layer, said second dielectric layer being filled in at least said through-holes; and said second dielectric layer comprising an organic resin; and said structure further comprises a third dielectric layer on said second dielectric layer; and said first, second and third dielectric layers have the same refractive indices.

36. A photonic crystal structure comprising:
a first dielectric layer;
a dielectric network provided on said first dielectric layer, said dielectric network comprising a plurality of through-holes which are arrayed in a two-dimensional lattice pattern;
a second dielectric layer provided on said first dielectric layer, second dielectric said second dielectric layer being filled in at least said through-holes; and
a third dielectric layer provided on said dielectric layer;
wherein said first dielectric layer has the same refractive index as that of said second dielectric layer.

37. A photonic crystal structure comprising:
a first dielectric layer;
dielectric pillar lattice comprising a plurality of dielectric pillars, said plurality of dielectric pillars provided on said first dielectric layer and arrayed in a two-dimensional lattice pattern;
a second dielectric layer provided on said first dielectric layer and filled in at least a space among said dielectric pillars; and
a third dielectric layer provided on said second dielectric layer;
wherein said first, second and third dielectric layers have the same refractive indices.

38. A photonic crystal structure comprising:
a first dielectric layer;
a dielectric network provided on said first dielectric layer, said dielectric network comprising a plurality of through-holes which are arrayed in a two-dimensional lattice pattern; and
a second dielectric layer provided on said first dielectric layer, said second dielectric layer being filled in at least said through-holes; and
said second dielectric layer comprising an organic resin; and
said structure further comprises a third dielectric layer on said second dielectric layer; and
said first, second and third dielectric layers have the same refractive indices.

39. A photonic crystal structure comnrising:
a first dielectric layer;
a dielectric network provided on said first dielectric layer, said dielectric network comprising a plurality of through-holes which are arrayed in a two-dimensional lattice pattern; and
a second dielectric layer provided on said first dielectric layer, said second dielectric layer being filled in at least said through-holes; and
said second dielectric layer comprising an organic resin; and
said dielectric network has their end on the side of said first dielectric layer, which is above said interface.

40. A photonic crystal structure comprising:
a background medium; and
a plurality of pillar-type or hole-type medium atoms disposed in said background medium, said plurality of medium atoms being disposed in a two-dimensional plane in a lattice pattern to form a medium atom lattice; the refractive index distribution being mirror-symmetrical in a thicknesswise direction of the photonic crystal structure.

41. The photonic crystal structure according to claim 40, wherein said refractive index distribution is mirror-symmetrical in the thicknesswise direction in the range where at least energy of wave-guided light is distributed.

42. A photonic crystal comprising:
a plurality of atomic dielectric pillars, each having a refractive index distribution and a structure which are both mirror-symmetrical in a thicknesswise direction of said photonic crystal, said plurality of atomic dielectric pillars being arrayed in a two-dimensional lattice pattern to form a dielectric pillar lattice; and a surrounding dielectric material in which said dielectric pillar lattice is disposed, said surrounding dielectric material having a refractive index distribution which is uniform at least in the thicknesswise direction,
wherein said surrounding dielectric comprises an organic resin doped with a photo-amplifying material.

43. The photonic crystal structure according to claim 42, wherein said photo-amplifying material is a rare earth element or organic pigment.

44. A photonic crystal structure comprising:
a first dielectric layer;
a dielectric network provided on said first dielectric layer, said dielectric network comprising a plurality of through-holes which are arrayed in a two-dimensional lattice pattern; and
a second dielectric layer provided on said first dielectric layer, said second dielectric layer being filled in at least said through-holes; said second dielectric layer comprising an organic resin, wherein said dielectric network comprises a photo-amplifying material.

45. A photonic crystal structure comprising:
a first dielectric layer;
a dielectric network provided on said first dielectric layer, said dielectric network comprising a plurality of through-holes which are arrayed in a two-dimensional lattice pattern; and
a second dielectric layer provided on said first dielectric layer, said second dielectric layer being filled in at least said through-holes; said second dielectric layer comprising an organic resin, wherein said first dielectric layer comprises a photo-amplifying material.

46. A photonic crystal structure comprising:
a first dielectric layer;
a dielectric network provided on said first dielectric layer, said dielectric network comprising a plurality of through-holes which are arrayed in a two-dimensional lattice pattern; and
a second dielectric layer provided on said first dielectric layer, said second dielectric layer being filled in at least said through-holes; said second dielectric layer comprising an organic resin, wherein said said first and/or second dielectric layer comprises a photo-amplifying material.

47. A photonic crystal structure comprising:
a first dielectric layer;
a dielectric pillar lattice comprising a plurality of dielectric pillars, said plurality of dielectric pillars provided on said first dielectric layer and arrayed in a two-dimensional lattice pattern; and
a second dielectric layer provided on said first dielectric layer and filled in at least a space among said dielectric pillars; and
said second dielectric layer comprising an organic resin,
a third dielectric layer on said second dielectric layer, wherein said first, second
and third dielectric layers comprise a photo-amplifying material.

* * * * *